United States Patent
Chatterjee et al.

(10) Patent No.: US 12,468,670 B2
(45) Date of Patent: Nov. 11, 2025

(54) INTELLIGENT MACHINE LEARNING-BASED MAPPING SERVICE FOR FOOTPRINT

(71) Applicant: SAP SE, Walldorf (DE)

(72) Inventors: Swarnava Chatterjee, Benares (IN);
Nisheeth Agarwal, Lucknow (IN);
Ramana Mohanbabu, Bangalore (IN);
Stefan Feickert, Birkenau (DE);
Himanshu Goyal, Jaipur (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/902,990

(22) Filed: Sep. 5, 2022

(65) Prior Publication Data
US 2024/0078215 A1    Mar. 7, 2024

(51) Int. Cl.
| | | |
|---|---|---|
| *G06F 16/30* | (2019.01) | |
| *G06F 16/21* | (2019.01) | |
| *G06F 16/2457* | (2019.01) | |
| *G06F 16/248* | (2019.01) | |
| *G06F 16/28* | (2019.01) | |
| *G06N 5/022* | (2023.01) | |

(52) U.S. Cl.
CPC ...... *G06F 16/211* (2019.01); *G06F 16/24578* (2019.01); *G06F 16/248* (2019.01); *G06F 16/285* (2019.01); *G06N 5/022* (2013.01)

(58) Field of Classification Search
CPC .......... G06F 16/211; G06F 16/285; G06F 16/24578; G06F 16/248
See application file for complete search history.

(56) References Cited

U.S. PATENT DOCUMENTS

| | | | |
|---|---|---|---|
| 10,902,484 B1* | 1/2021 | Pepere | G06Q 20/145 |
| 11,556,508 B1* | 1/2023 | Sundararajan | G06N 20/00 |
| 2017/0147580 A1* | 5/2017 | Buchmann | G06F 16/24578 |
| 2022/0108326 A1* | 4/2022 | Schoeneboom | G06Q 50/04 |
| 2022/0207552 A1* | 6/2022 | Normand | G06Q 30/0631 |
| 2022/0253725 A1* | 8/2022 | Feng | G06N 20/00 |
| 2023/0089850 A1* | 3/2023 | Zhu | G06Q 30/0623 |
| | | | 705/7.29 |

OTHER PUBLICATIONS

CPC Version 2.1, Classifications on Economic Statistics, unstats. un.org, visited Aug. 24, 2022, 2 pages.

(Continued)

*Primary Examiner* — Khanh B Pham
(74) *Attorney, Agent, or Firm* — Klarquist Sparkman, LLP

(57) ABSTRACT

Intelligent mapping from created item information to sustainability reference content from a variety of sources can be implemented to facilitate created item footprint management and other sustainability applications. The difficult task of finding appropriate emission factors across a portfolio can be automated. Assisted search can be implemented using enhanced search techniques. Fallback mappings can be implemented to accommodate different levels of granularity during search. A machine learning model can be trained based on a variety of input data, including confirmed mappings, mapping history, and rules. The process of mapping to emission datasets can thus be simplified, enabling footprint calculations to proceed.

20 Claims, 19 Drawing Sheets

(56) References Cited

OTHER PUBLICATIONS

CPC, Version 2.1,—Code 01, Classifications on Economic Statistics, unstats.un.org, visited Aug. 24, 2022, 1 page.
"Harmonized System," *Wikipedia*, en.wikipedia.org, Aug. 13, 2022, 6 pages.
"Creating a Product Group," help.sap.com, visited Aug. 24, 2022, 1 page.
"SAP launches product to help firms track supply chain emissions," Reuters, reuters.com, Jun. 16, 2020, 2 pages.
Wottke, "Product Deep Dive: Welcome to Product Footprint Management from SAP," blogs.sap.com, Sep. 2, 2021, 17 pages.
Wottke, "Product Deep Dive: Emission Factors Management in SAP Product Footprint Management," blogs.sap.com, Oct. 25, 2021, 5 pages.
Feature Scope Description for SAP Product Footprint Management, SAP, Dec. 20, 2021, 6 pages.
"SAP Carbon Footprint Solution Helps Companies Redesign for Sustainability," Press release by SAP News, SAP, Sep. 16, 2021, 5 pages.
SAP Global Trade Services: User Guide, SAP, Jun. 15, 2017, 964 pages.
"Pathfinder Framework," World Business Council for Sustainable Development, Nov. 2021, 47 pages.

* cited by examiner

| activityId | filename | reference product | activityName | geography | startDate | endDate | CPC_classification Value | exchange unitName | IPCC 2013 climate chage-GWP 100a (kg COS-E) | CPC Ver. 2.1 | HS 2017 |
|---|---|---|---|---|---|---|---|---|---|---|---|
| 75b71666- | 75b71666- | potato | potato production | | | | | | | | 74020 |
| | | | | | | | | | | | 7011 |
| | | | | | | | | | | | 7011 |
| | | | | | | | | | | | 12130 |
| 51c68947- | 51c68947 | potato | potato production | CA-QC | 2010-01-0 | 2020-12-31 | 01510: Potatoes | 1 kg | 0,204033 | 01510 | 7011 |
| d5038b0f- | d5038b0f | potato | potato production | CN | 2003-01-0 | 2020-12-31 | 01510: Potatoes | 1 kg | 0,257255 | 01510 | 7011 |
| 3a7e14d5- | 3a7e14d5 | potato | potato production | IN | 2000-01-0 | 2020-12-31 | 01510: Potatoes | 1 kg | 0,251661 | 01510 | 7011 |
| 1097a23f- | 1097a23f | potato | potato production | RU | 2009-01-0 | 2020-12-31 | 01510: Potatoes | 1 kg | 0,11321 | 01510 | 7011 |
| 17262006- | 1726006 | potato | potato production | RoW | 2001-01-0 | 2020-12-31 | 01510: Potatoes | 1 kg | 0,143207 | 01510 | 7011 |
| 24ead852- | 24ead852 | potato | potato production | UA | 2009-01-0 | 2020-12-31 | 01510: Potatoes | 1 kg | 0,15417 | 01510 | 7011 |
| 21a5e692- | 21a5e692 | potato, Swiss integrated production | potato production | US | 2001-01-0 | 2020-12-31 | 01510: Potatoes | 1 kg | 0,149056 | 01510 | 7011 |
| | | | potato production, Swiss integrated production, intensive | CH | 1996-01-0 | 2020-12-31 | 0150: Potatoes | 1 kg | 0,082193 | 01510 | 7011 |
| 965183d0- | 965183d0 | potato, organic | potato production, organic | CH | 1996-01-0 | 2020-12-31 | 0150: Potatoes | 1 kg | 0,121506 | 01510 | 7011 |
| a57666ce- | a57666ce | potato, organic | potato production, organic | RoW | 1996-01-0 | 2020-12-31 | 0150: Potatoes | 1 kg | 0,121664 | 01510 | 7011 |
| 0ffb931f-8 | 0ffb931f-8 | potato seed, Swiss integrated production | potato seed production, Swiss integrated production, at farm | CH | 1996-01-0 | 2020-12-31 | 0150: Potatoes | 1 kg | 0,126413 | 01510 | 7011 |
| d6623ba9- | d6623ba9 | potato seed, at farm | potato seed production, at farm | GLO | 1996-01-0 | 2020-12-31 | 0150: Potatoes | 1 kg | 0,130807 | 01510 | 7011 |
| 2a67250b- | 2a67250b | potato seed, organic, at farm | potato seed production, organic, at farm | CH | 1996-01-0 | 2020-12-31 | 0150: Potatoes | 1 kg | 0,171165 | 01510 | 7011 |
| 89362fce-k | 89362fce-k | potato seed, organic, at farm | potato seed production, organic, at farm | RoW | 1996-01-0 | 2020-12-31 | 0150: Potatoes | 1 kg | 0,171169 | 01510 | 7011 |

| Rank | Validity Period | Product | Commodity Code | Product Group | Supplier | Supplier Country/Region | Receiving Plant | Receiving Plant Country/Region | Select Emission Factor | Emission Factor |
|---|---|---|---|---|---|---|---|---|---|---|
| 1 | Jan 1, 2010 - Jan 1, 2020 | Cocoa Beans (COCOABEA1) | 4110 | Cocoa (COA) | Supplier A (3872) | India (IN) | Cologne Plant (1010) | Germany (DE) | | |
| 2 | Feb 1, 1990 – Feb 1, 2000 | Rice Flour (rtfr345) | 5110 | Flour (FLR) | Supplier G (3872) | Germany (DE) | Dehli Plant (1010) | India (IN) | | |
| 3 | Mar 1, 2010 – Jan 1, 2020 | Wheat Flour (WFLR1) | 9110 | Milk (MLK) | Supplier H (3872) | Germany (DE) | Frankfurt Plant (1122) | Germany (DE) | | |
| 4 | Jan 1, 2010 - Jan 1, 2021 | Cocoa Syrup (CSYRP1000) | 4110 | Cocoa2 (COA2) | Supplier B (4872) | India (IN) | Cologne Plant (1010) | Germany (DE) | | |
| 5 | Jan 1, 2010 – Jan 1, 2022 | Sugar (1011) | 9119 | Cocoa3 (COA3) | Supplier N (3872) | Germany (DE) | Cologne Plant (1010) | India (IN) | | |
| 6 | Jan 1, 2010 – Jan 1, 2020 | Coconut Oil (COL12) | 4110 | Cocoa (COA) | Supplier C (6872) | India (IN) | Dehli Plant (1010) | Germany (DE) | | |
| 7 | Jan 1, 2010 – Jan 1, 2020 | Cream (11b981) | 4110 | Milk (MLK3) | Supplier D (7872) | India (IN) | Frankfurt Plant (1122) | Germany (DE) | | |
| 8 | Mar 1, 2010 – Jan 1, 2020 | Cocoa Powder (CPWDR345) | 9120 | Oil & Fats (OFA) | Supplier E (872) | India (IN) | Cologne Plant (1010) | Germany (DE) | | |
| 9 | Jan 1, 2010 – Jan 1, 2020 | Brown Sugar (1111) | 4110 | Cream (11b981) | Supplier F (1172) | India (IN) | Frankfurt Plant (1122) | Germany (DE) | | |

SAP Mapping Templates ▶

Select Emission Factor for Cocoa Powder from Supplier B, India ⓘ

Products ▶ | Cocoa Powder

Filter By ▶

Sustainability Content Package

☒ Ecoinvnet 3.17    13
☐ Gaby 2021    12
☐ Ariba CDN    9
☐ Plastics Europa    9
☐ Probas 2018    8

Show More

Main Category

☐ Product Name    13
☐ Product Description    12
☐ Commodity Code    9
☐ Supplier    9
☐ Supplier Country/Region    8

Show More

⚠ No Emission Datasets found for Cocoa Powder (Cpw1000), CPC - 236    1510

Nearest possible emission Dataset Suggestions (4)

○ Cocoa Powder 8    Classification Code: CPC (2361)    Emission Factor: 2.567 KG/KG    Product Name: Cocoa Paste ○ Cocoa Powder abc    Classification Code: HS (1704.10)    Emission Factor: 3.5 KG/2 KG    Product Name: Sugar Confectionery (including White Chocolate)

○ Cocoa ABC    Classification Code: CPC (2362)    Emission Factor: 5.567 KG/KG    Product Name: Cocoa Butter, fat and oil ○ ABC Cocoa    Classification Code: ISIC (1543)    Emission Factor: 1.7 KG / 1 KG    Product Name: Chocolate and other food prep Select Emission Factor

1500

◁ SAP  Mappings ▼  New Design  ⓧ ⓞ ⚲ ⓘ Ⓝ🄰

Map Purchased Products with Emission Factors

Download Template ▼  |  Upload Data  |  Delete Data  |  Back to Calculation Template

| All Mappings (25) | Conflicts (0) | | | | | | | | | Search 🔍 | | |
|---|---|---|---|---|---|---|---|---|---|---|---|---|
| Rank | Validity Period | Product | Commodity Code | Product Group | Supplier | Supplier Country | Plant | Plant Country/Re | Package ID | Source ID | Dataset Version |
| 12 | Jan 5, 2018 – Jan 5, 2024 | BUTTER100 | Any | Any | Any | Germany (DE) | Any | Any | 000002 | 1016 | 1.0.0 |
| 13 | Jan 5, 2018 – Jan 5, 2024 | COCOIL100 | Any | Any | Any | Malaysia (MY) | Any | Any | 000002 | 1017 | 1.0.0 |
| 14 | Jan 5, 2018 – Jan 5, 2024 | PALOIL100 | Any | Any | Any | India (IN) | Any | Any | 000002 | 1018 | 1.0.0 |
| 15 | Jan 2, 2018 – Jan 2, 2024 | Any | 151191 | Any | Any | Brazil (BR) | Any | Any | 000001 | 1011 | 1.0.0 |
| 16 | Jan 2, 2028 – Jan 2, 2024 | Any | 151191 | Any | Any | Argentina (AR) | Any | Any | 000001 | 1011 | 1.0.0 |
| 17 | Jan 2, 2018 – Jan 2, 2024 | Any | 151191 | Any | Any | Chile (CL) | Any | Any | 000001 | 1011 | 1.0.0 |
| 18 | Jan 1, 2018 – Jan 1, 2024 | Any | Any | Cocoa (COA) | Any | Ghana (GH) | Any | Any | 000001 | 1001 | 1.0.0 |
| 19 | Jan 1, 2018 – Jan 1, 2024 | Any | Any | Cocoa (COA) | Any | Indonesia (ID) | Any | Any | 000001 | 1002 | 1.0.0 |
| 20 | Jan 1, 2018 – Jan 1, 2024 | Any | Any | Cocoa (COA) | Any | Guatemala (GT) | Any | Any | 000001 | 1003 | 1.0.0 |
| 21 | Jan 2, 2018 – Jan 2, 2024 | Any | Any | Flour (FLR) | Any | South Africa (ZA) | Any | Any | 000001 | 1004 | 1.0.0 |
| 22 | Jan 3, 2018 – Jan 4, 2024 | Any | Any | Flour (FLR) | Any | Germany (DE) | Any | Any | 000001 | 1005 | 1.0.0 |
| 23 | Jan 4, 2018 – Jan 4, 2024 | Any | Any | Flour (FLR) | Any | India (IN) | Any | Any | 000001 | 1005 | 1.0.0 |
| 24 | Jan 5, 2018 – Jan 5, 2024 | Any | Any | Flour (FLR) | Any | Switzerland (CH) | Any | Any | 000001 | 1005 | 1.0.0 |
| 25 | Jan 2, 2018 – Jan 2, 2024 | Any | 151190 | Any | Any | Any | Any | Any | 000001 | 1011 | 1.0.0 |

More

INTELLIGENT MACHINE LEARNING-BASED MAPPING SERVICE FOR FOOTPRINT

FIELD

The field generally relates to lifecycle analysis of products, such as product footprint analysis based on emission or other factors.

BACKGROUND

As consumers become more familiar with environmental issues, they demand more information about the sustainability of products they consume. For example, a box of cookies may contain ingredients that come from various places around the world. The total environmental product footprint may depend on identifying the constituent ingredients (e.g., cocoa, sugar, etc.) as well as related activities (e.g., processing the cocoa, transporting the cocoa, storing the cocoa, etc.).

The simple question of "How does this product impact the environment?" can thus become a complicated matter. Although there are some sources for environmental impact data, there remains a large disconnect between such data and a final calculation of environmental impact. Accordingly, improvements in the field are still needed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises receiving an indication of a created item component represented in a database as a created item component record; performing a search against a plurality of emission dataset records for an emission dataset record corresponding to the created item component; returning search results comprising one or more found emission dataset records out of the plurality of emission dataset records; presenting the one or more found emission dataset records in a user interface for confirmation; receiving a selection of a confirmed emission dataset record out of the one or more found emission dataset records; and creating a mapping between the created item component record and the confirmed emission dataset record.

In another embodiment, a computing system comprises at least one hardware processor; at least one memory coupled to the at least one hardware processor; and one or more non-transitory computer-readable media having stored therein computer-executable instructions that, when executed by the computing system, cause the computing system to perform: receiving an indication of a created item component represented in a database as a created item component record; performing a search against a plurality of emission dataset records for an emission dataset record corresponding to the created item component, wherein the search weights a classification code attribute and a description attribute; returning search results comprising one or more found emission dataset records out of the plurality of emission dataset records; presenting the one or more found emission dataset records in a user interface for confirmation; receiving a selection of a confirmed emission dataset record out of the one or more found emission dataset records; and creating a mapping between the created item component record and the confirmed emission dataset record.

In another embodiment, one or more non-transitory computer-readable media comprising computer-executable instructions that, when executed by a computing system, cause the computing system to perform operations comprising receiving an indication of a created item component represented in a database as a created item component record; performing a search against a plurality of emission dataset records for an emission dataset record corresponding to the created item component, wherein the search weights a classification code attribute and a description attribute; returning search results comprising one or more found emission dataset records out of the plurality of emission dataset records; presenting the one or more found emission dataset records in a user interface for confirmation; receiving a selection of a confirmed emission dataset record out of the one or more found emission dataset records; training a machine learning model with training data comprising a mapping between the created item component record and the confirmed emission dataset record; and predicting with the trained machine learning model a new mapping between a new created item component record and a new emission dataset record.

As described herein, a variety of features and advantages can be incorporated into the technologies as desired.

BRIEF DESCRIPTION OF THE DRAWINGS

FIG. 4 is a block diagram of example reference sustainability content.

FIGS. 14, 15, and 16 are screenshots of a user interface for achieving intelligent machine learning-based mapping for footprint.

DETAILED DESCRIPTION

Example 1—Overview

The process of fully managing a product footprint can be hindered by a basic inability to calculate the entire footprint for any given product, let alone the vast array of products offered by a typical enterprise. In a global context, a single product may have many components, each of which can have different suppliers, countries of origin, commodity codes, and the like, and multiple products multiply the components and hurdles.

One root of the problem is the monumental task of bringing together extensive business data from a business system with sustainability reference content. The task of mapping products and product components to reference sustainability content datasets is not an easy one. Besides being of different formats and using different attribute names, the nomenclature used can be so different that the same material may be referred to differently in the two datasets. For example, a simple material like "sugar" may be referred to as "refined sugar" in a sustainability content, but as "rawmatzucker2" in an enterprise resource management (ERP) system.

To further add to the complexity, mappings are desired not to be done simply on the material alone, but on a more specific sustainability reference content data match, based on multiple criteria such as material, supplier, supplier country, the receiving plant country, and the like. Such more specific matches account for the peculiar nature of footprint management.

To facilitate the task, hard mapping rules can be used to manually map the product data to availability sustainable reference content. Such hard mapping rules can include a specific condition and a specific sustainability dataset record. The hard rule is then applied during footprint calculations. For example, a hard mapping rule like "IF product data material name is rawmatzuker2 AND supplier country is FR, THEN map to sustainability reference content dataset 931003." However, this presents a very tedious task especially when it is done for a vast range of materials at different levels of granularities. Any automated assistance to the process would greatly help the mapping process, which opens the door to accurately managing sustainability metrics of products and business processes.

Figure 1:
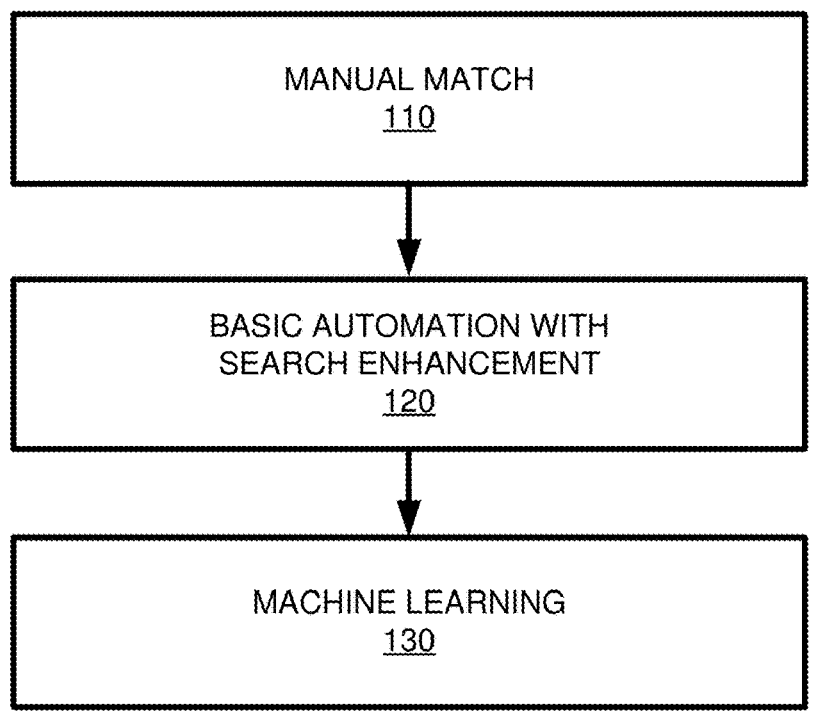
FIG. 1 is a block diagram of example horizons of intelligent mapping.

Automation can be implemented as intelligent mapping services that can be generally grouped into a progression 100 of three example horizons shown in FIG. 1. In the first horizon 110, manual matching is supported, but further assistance is provided. For example, simple rules can be supported by which a user identifier can map a product component to a reference sustainability dataset (e.g., with an emission factor that can then be used for footprint calculations).

Figure 7:
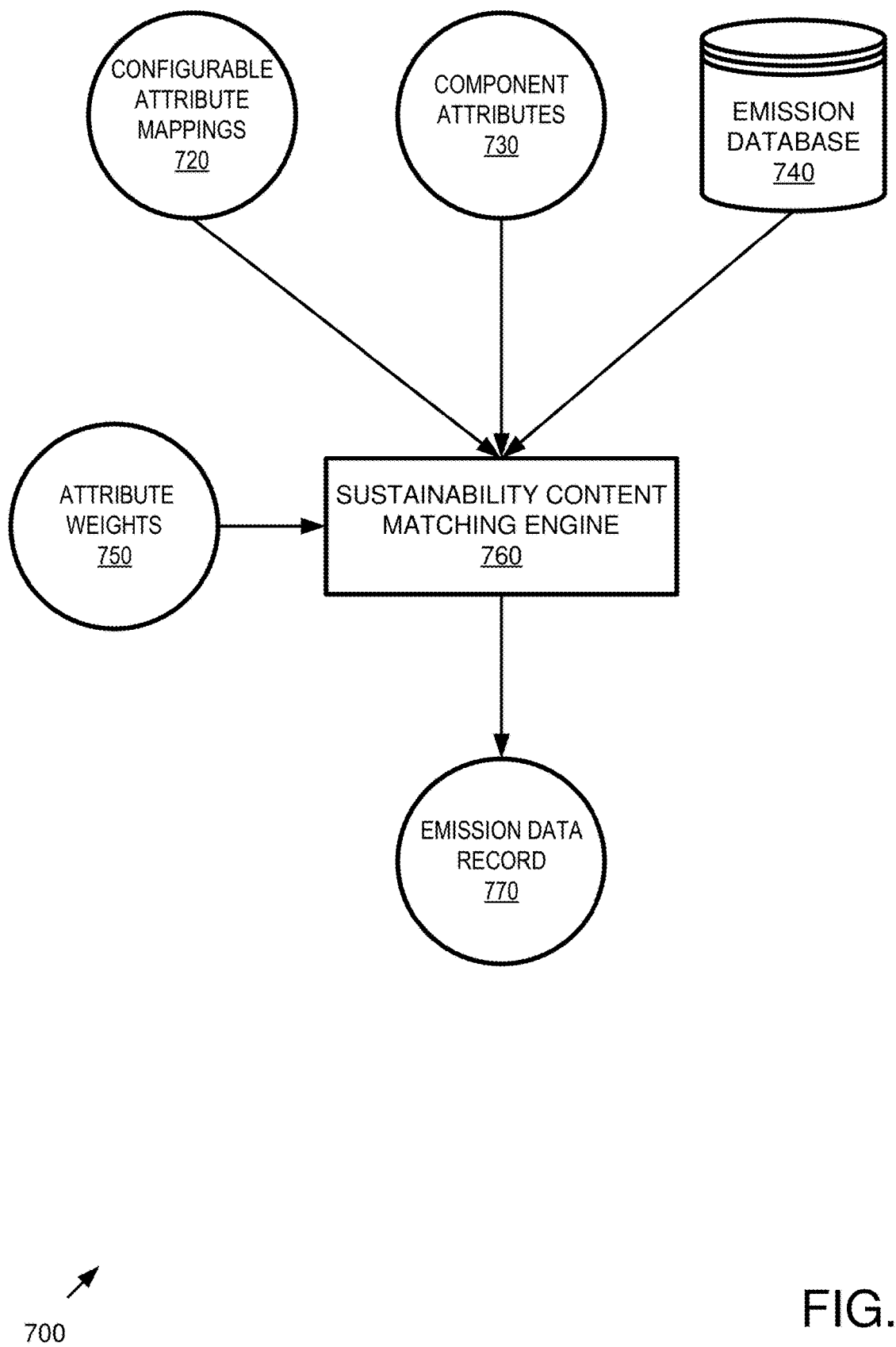
FIG. 7 is a block diagram of an example system implementing sustainability content searching.

Rules can be generated from manual attribute (field) name mapping, and configurable attribute mappings can be supported as shown in FIG. 7. For example, in a scenario where there are key identifiers for a commodity code (e.g., HS code) which may be available from both the ERP and sustainability datasets. In such a case, the analyst can simply configure such attribute mappings, and the software can derive rules. For example, an attribute name mapping such as "HS code field name from Sustainability Reference Content dataset to Commodity Code field name from the ERP material master data" and "Reference Location field name from Sustainability Reference Content dataset to Supplier Country field name from ERP material master data" can be maintained during searching. Such an attribute mapping can result in found mappings between records where the attribute values for the attribute names match. Thus, the manual effort is already reduced because mapping for individual records can be avoided.

Such an approach can be helpful but has trouble with situations in which there are no attributes for which the values maintained in the two datasets are the same. At 120, the intelligent mapping progresses to a next level that is in the domain of assisted search. Mapping between attributes can be configured, and fuzzy/semantic matching can be performed. Further, fallback mappings between attributes support searching different levels of granularity, supporting a flexible approach to matching when a primary mapping fails to find a suitable match. Weighting between attributes can also be supported. A ranked list of proposed mappings (e.g., the search results) can be shown, and a user identifier can confirm the desired mapping. The configurable attribute mappings can be derived without user configuration.

At 130, the intelligent mapping moves to a next level that is in the domain of machine learning. Leveraging old rules, prior confirmed matches, and new matches going forward, a machine learning model can predict a mapping with a confidence score. Even in the absence of explicit matches in attribute values or attribute mappings, mappings can be proposed. Such a mapping can be automatically implemented, temporarily implemented, or conditionally implemented based on confirmation in a user interface.

In practice, hard rules can be automatically predicted and confirmed. For example, "IF (product='Butter100') AND (SupplierCountry='DE') THEN SustainabilityContentSourceId=PU003." Other predictions can relate to attribute mappings, more dynamic rules, and the like as described herein.

In practice, elements from the different horizons 110, 120, 130 can be implemented in combination to provide a holistic approach to tackling the mapping problem. In order to manage the entire environmental footprint or environmental impact of a product, a first helpful step is mapping product components to an emission factor, which can be more easily achieved using the intelligent mapping technologies described herein. As a result, mapping can be achieved sooner and with fewer resources, leading to earlier adoption of product footprint management and improved attention to sustainability considerations.

In any of the examples, the mappings can be used not only for product footprint calculation, but more advanced footprint management (e.g., exploring possible ways to balance or minimize the footprint), clean operations (e.g., product compliance) applications, and environmental health and safety management (e.g., compliance) applications.

The described technologies thus offer considerable improvements over conventional mapping techniques.

Example 2—Example Challenges

One of the challenges of mapping product information is that gaps in product portfolio coverage, including any materials (raw or intermediaries) across multiple plant locations can be an obstacle to product footprint management. Often times it is difficult to find an exact match and the user settles for a closest fit. Finding such a closest fit is a manual and error prone activity. The various technologies described herein can greatly reduce the time to having sufficient coverage of the product portfolio.

Figure 2:
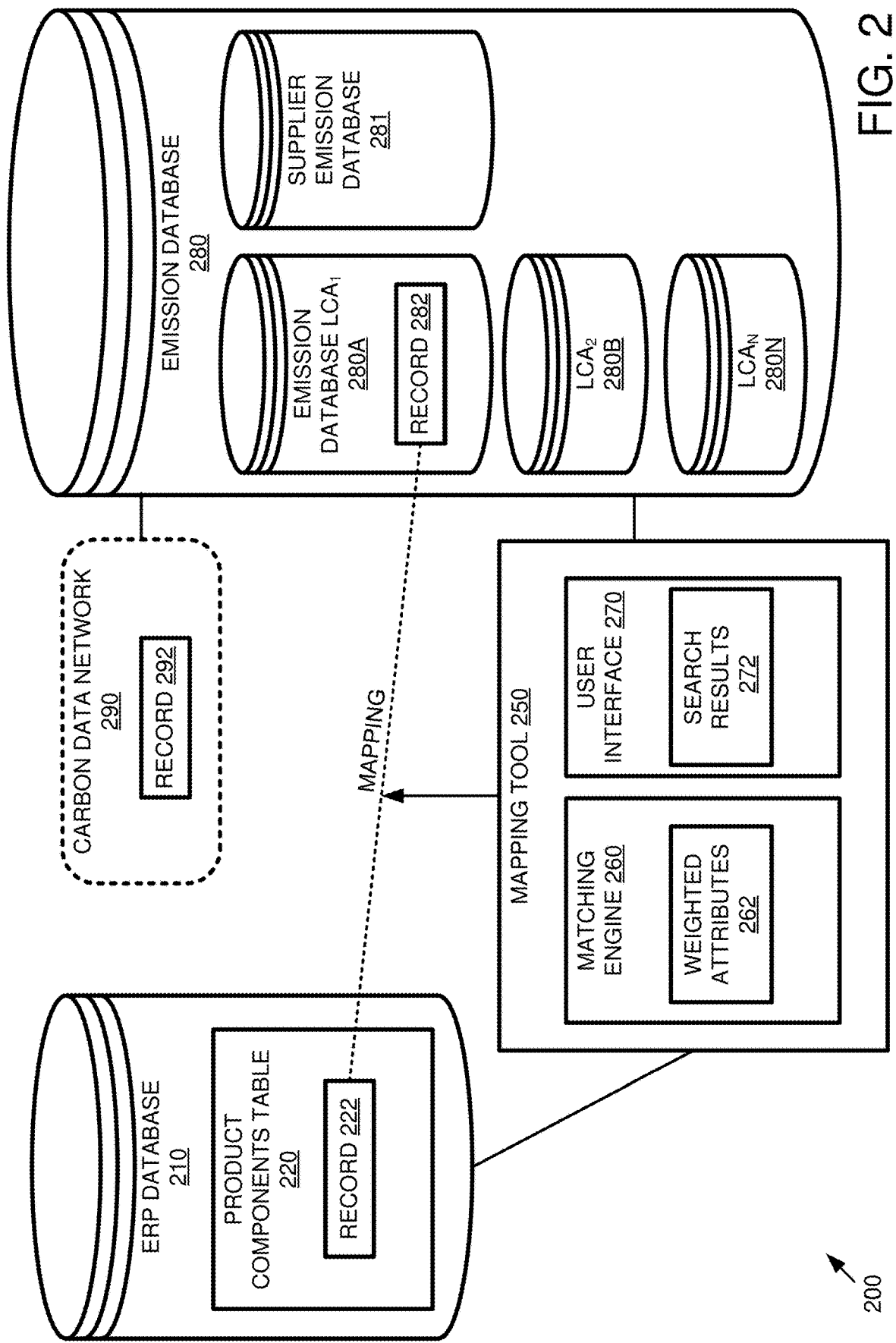
FIG. 2 is a block diagram of an example system implementing intelligent machine learning-based mapping for footprint and other applications.

Example 3—Example System Implementing Intelligent Machine Learning-Based Mapping for Footprint FIG. 2 is a block diagram of an example system 200 implementing intelligent machine learning-based mapping for footprint and other applications as shown. In the example, the system 200 can map a product component record 222 to an emission dataset record 282, thus creating a mapping between a product component and an emission factor by which a sustainability footprint can be calculated for a product comprising the product component. In practice, other related information such as supplier data can be incorporated. "Supplier" is sometimes called "provider" herein.

As shown, product component information is stored in an enterprise resource planning (ERP) database 210 in the form of a product component table 220, specifically a record 222 which contains the product component attributes (e.g., name/value pairs) for a given product component.

The mapping tool 250 can receive an indication of the product component record 222 and apply the intelligent mapping technologies described herein to find a match from among the many sustainability datasets in the emission database 280. A matching engine 260 can make use of attributes 262 (e.g., weighted or otherwise) to find one or more found emission dataset records (e.g., search results 272), which are presented as proposed emission dataset records for confirmation in the user interface 270. The user interface 270 is configured to receive a selection of a confirmed emission dataset record out of the proposed ones and the mapping tool 250 then creates a mapping between the product component record and the confirmed emission dataset record (e.g., the emission factor is associated with the product component).

In some cases, a mapping can take the form of a rule that achieves multiple mappings (e.g., plural product component records are mapped to respective emission dataset records).

As shown, the emission database 280 can be an aggregation of emission databases 280A-N from a plurality of different life cycle assessment (LCA) content providers ($LCA_{1-n}$). Such an arrangement is helpful because different LCA content providers may specialize in different geographical region, so coverage for a global scenario can be supported. In practice, the emission database can take the form of one or more spreadsheet files provided by the LCA content provider or other source.

The emission database 280 can also comprise a database 281 that includes emission factor records from one or more suppliers. For example, the system 200 can support a carbon data network 290 that contains emission dataset records 292 with supplier emission factors that are provided by one or more suppliers (e.g., of product components) to the network 290 that are downloaded locally or mapped to in the cloud. Custom (e.g., "bring-your-own") emission data sets can also be supported.

The system 200 can also comprise one or more non-transitory computer-readable media having stored therein computer-executable instructions that, when executed by the computing system, cause the computing system to perform any of the methods described herein.

In practice, the systems shown herein, such as system 200, can vary in complexity, with additional functionality, more complex components, and the like. For example, the variety of records in the emission database 280 can be quite large. Searching enhancements such as configurable attribute mappings, attribute weights, and the like shown in FIG. 6 can be included. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 200 and any of the other systems described herein can be implemented in conjunction with any of the hardware components described herein, such as the computing systems described below (e.g., processing units, memory, and the like). In any of the examples herein, the EPR database 210, weighted attributes 262, the emission database 280, and the like can be stored (e.g., persisted) in one or more computer-readable storage media or computer-readable storage devices. The technologies described herein can be generic to the specifics of operating systems or hardware and can be applied in any variety of environments to take advantage of the described features.

Figure 3:
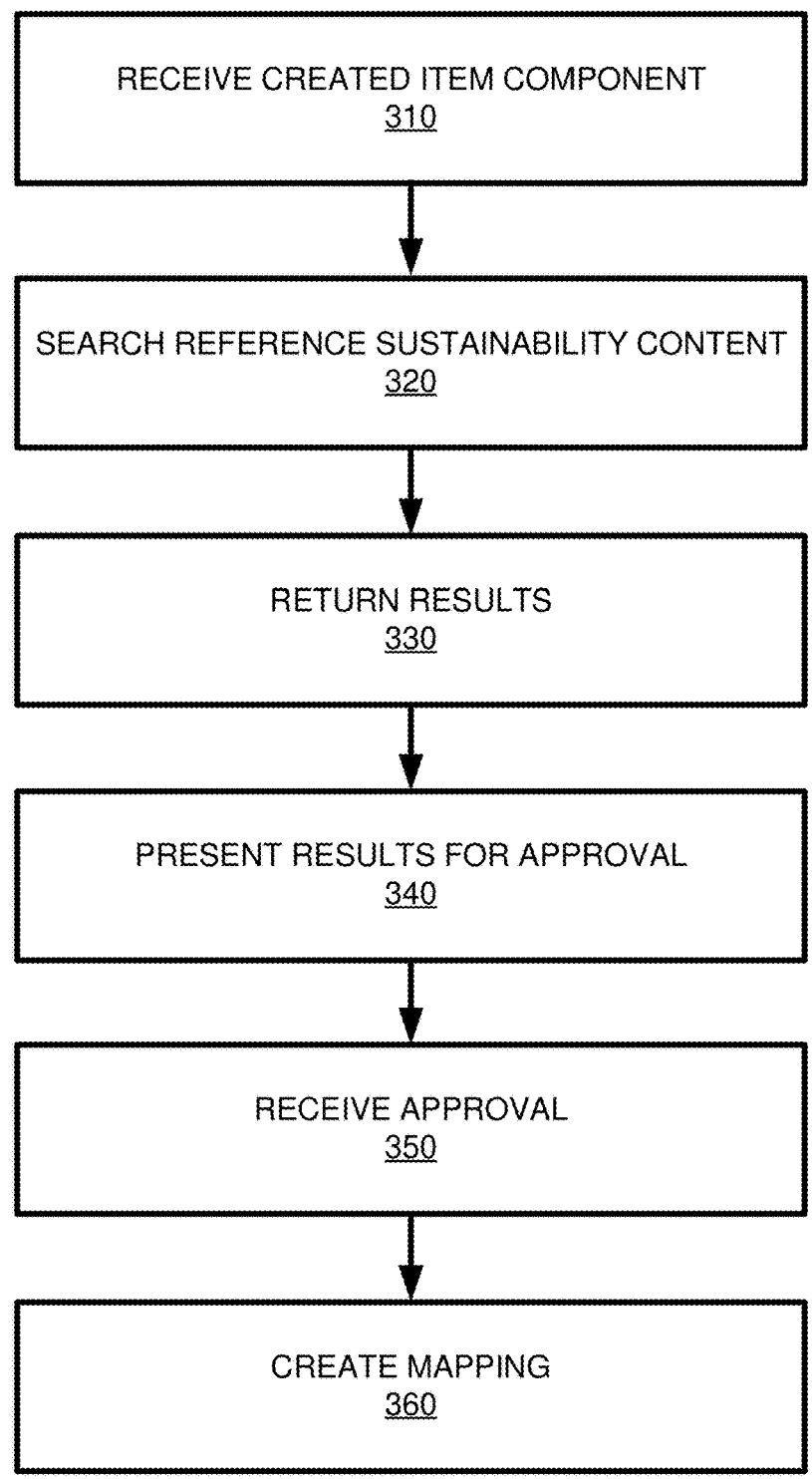
FIG. 3 is a flowchart of an example method of implementing intelligent machine learning-based mapping for footprint and other applications.

Example 4—Example Method Implementing Intelligent Machine Learning-Based Mapping for Footprint FIG. 3 is a flowchart of an example method 300 of implementing intelligent machine learning-based mapping for footprint and other applications as shown and can be performed, for example, by the system of FIG. 2. The automated nature of the method 300 can be used in a variety of situations such as product footprint management as described herein.

In the example, at 310, a product component is received. In practice, an indication of a product component represented in a database as a product component record is received. Such an indication can comprise a record identifier, attributes of the record (e.g., attribute/value pairs), or the like. The product component can include not only a product per se, but further relevant description, such as supplier, geographical origin, and the like. Thus, the process of mapping a product component to an emission factor can be facilitated. Product components can be processed as selected from a user interface, one after another, in groups, or the like.

At 320, a search for reference sustainability content (e.g., an emission factor) is performed. In practice, a search is performed against a plurality of emission data set records for an emission dataset record corresponding to the product component. As described herein, such a search can weight one or more attributes, such as a classification code attribute, a description attribute, and the like. In practice, search can be based on geographical location (e.g., the source of the product component), one or more product component classification codes, a textual description of the product component, or combinations thereof. Classification codes can be segmented into a sub-segment of the entire code and such sub-segment used during search (e.g., to find a product group, general product type, or the like that matches). Such matches can be helpful because it avoids a hole in the mappings where a product component's impact would otherwise be computed as zero. Search can filter out invalid records (e.g., a specified date is outside of the validity window).

At 330, results of the search are returned. Such results comprise one or more found emission dataset records out of the plurality of emission dataset records (e.g., the matching records).

At 340, the one or more found emission dataset records are presented in a user interface as proposed emission dataset records for confirmation. Records can include relevant information to assist in selection, including description of product component in the emission dataset record. Further tools can be used to help select a desired single data set record for mapping to which the product component is matched.

At 350, a selection of a confirmed emission dataset record out of the one or more proposed emission dataset records is received. For example, a selection in the user interface can be received to indicate which record is desired.

At 360, a mapping between the product component record and the confirmed emission dataset record is created. For example, a code or other reference to the emission dataset record, the emission factor itself, of other information can be stored as associated with the product component. Subsequently, when product footprint management is performed, the emission factor of the confirmed emission dataset record can be used during calculations. For example, a product footprint calculation that incorporates the emission factor can be performed as described herein.

As described herein, configurable attribute mappings can be supported.

In a machine learning scenario, features of the confirmed emission dataset record can be incorporated into a training record, and a machine learning model can be trained with training data comprising the training record. Such training can leverage cross-tenant training data. Training can weight attributes in favor of geographical location, one or more product component classification codes, and a textual description of the created item. Past rules can be synthesized as search results, and such results can be incorporated into the training data.

The method 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, returning results can be described as sending results depending on perspective.

Example 5—Example Enterprise Resource Planning Database

In any of the examples herein, product information can cover not just information about the physical product itself, but activities related to the product. Because such information is typically stored in an enterprise resource planning (ERP) database, the product information is sometimes simply called "the ERP database." In practice, the following information is persisted as attributes (fields) in database tables:

Product Table(s):
 Product Description
 Product Classification System
 Trading—Product Commodity Code (Harmonized System, Central Product Classification)
 Product Plant Location (Country, Region Address)
 Product Group Description
 Base Unit of Measure
Supplier Table(s):
 supplier location (country, region address)

Example 6—Example Reference Sustainability Content

In any of the examples herein, reference sustainability content (or simply "reference content" or "sustainability content") can specify environmental impact related to product components such as a raw material, constituent ingredients, activities, or the like. For example, reference emission factors are specified that indicate an amount of greenhouse gas emission per unit of product component, which can be a measure of weight, volume, distance, area, or the like. Thus, the content is sometimes also called "emission factors." Additional information such as metadata indicating a source of the data, geographical indicators, and validity windows can be included.

In practice, such content can comprise emission dataset records (such a record is sometimes simply called a "dataset") that comprise description of a material or activity, related geographic information, unit of measure and ultimately, an emission factor on which sustainability impact calculations can be based.

For the sake of convenience, such data is sometimes simply called "sustainability content" or "reference sustainability content." An example list of attributes follows:
Sustainability Data Table(s) or Sheet(s):
 Activity Description, Reference Product Description, Product Long Info
 Dataset Classification (Harmonized System, Central Product Classification)
 Dataset Geography
 Dataset Quality Indicators
 Base Unit of Measures
 Generic Name/Value properties Life cycle analysis providers can provide such content and may specialize in their domain, geographical area(s), content availability, content quality, content coverage, industry and functional scope, and other such factors.

FIG. 4 is a block diagram of example reference sustainability content. In the example, the following attributes are present: activityID, filename, reference product, activity/name, geography, validity (startDate endDate), CPC_classificationValue, exchange amount, exahngeUnitName, the emission factor IPCC 2013-climatechange-GWP 100a (kgCO2), CPC ver. 2.1 code, and HS code. Using the format shown, one dataset entity (sometimes simply called a "dataset" or "record") can be identified as a combination of reference product, activity name, and geography. A logical product can be a combination of reference product name and activity name (product and process). One logical product can have one or more geographic instances. A mapping can be to any geographic instance of a logical product, and one mapping can map to one geographic instance while a second mapping maps to another, different geographic instance. Geographies can be interpreted in the content of geographies per logical product. For example, in the case of "potato/potato production," if emission factors are listed for CA-QC, CN, IN, RU, UA, and US, the RoW (rest-of-the-world) dataset can be chosen if geography is not CA-QC, CN, IN, RU, UA, or US. Thus, rest-of-world geographical processing can account for the presence of specified geographies within the sustainability content and act as a fallback geographic indication when an indication for a specific geographic location is not present in the data. For a logical record, it can be determined when to map to a rest-of-the-world dataset based on absence of a specific country in any parallel dataset within the plurality of emission dataset records.

Example 7—Example Weights During Search

In any of the examples herein, attribute weights can be incorporated to result in more relevant search results (e.g., matches) for proposed mapping. For example, a commodity code (e.g., article number, CAS, EAN, HS Code, CPC Code), and supplier name can be weighted very highly (e.g., 5). A product name or product description can be weighted highly (e.g., 4), a product group can be weighted less (e.g., 3), a supplier country can be weighted even less (e.g., 2), and product physical attributes such as color and size can be weighted less (e.g., 1). Weights can be changed via configuration, and some attributes can be weighted at zero (0).

Thus, a classification code attribute and a description attribute can be weighed more highly than other attributes.

Weights can be implemented by combining degree of match between attributes according to weight. So, for example, a record having a partial match on a highly weighted attribute may be ranked higher than a record having an exact match on a low weighted attribute. Ties between two matches (e.g., both match on three attributes) can be resolved in favor of the match having an attribute match on a more highly weighted attribute.

Example 8—Example Product Components

In any of the examples herein, a product component can be a part of a product, whether physical or action (e.g., a material, ingredient, activity, or the like). To determine the footprint of a product, a footprint for separate components of the product can be calculated and combined as described herein. For example, for a cookie manufacturer, separate components can comprise sugar, flour, cocoa, and the like. For a cocoa manufacturer, components may include the activities related to producing the cocoa (e.g., drying, processing, packaging, and the like).

A product is sometimes called a "generated item" or "created item" herein. The technologies shown as applied to product components can equally be applied to products and vice versa.

Information about products, product components, and which product components make up a product are stored in an enterprise resource planning (ERP) database management system as records in database tables. Such information can include both a name and source for a component, which can indicate a geographical source (e.g., country or region).

Product components from different sources can have different environment impacts (e.g., emission factors). Consequently, it is possible to calculate the environmental footprint for a product as described herein by determining how much of the various product components are present in a given product. A combination of the environmental impacts of the individual components can then be combined to get an overall picture of the environmental product, even in the face of the complexities involved with products having the same description or code coming from various sources.

Further management is possible by comparing impact on product footprint by varying constituent products, their source (e.g., where they come from), and the like.

Example 9—Example Product Footprint Management

In any of the examples herein, a product footprint can be calculated (e.g., a metric value calculated based on reference emission factors or the like). In practice, such a product footprint can be calculated as part of footprint analysis. For convenience of the calculation, footprint analysis functionality, including footprint calculation, can be integrated into a footprint management application that provides a wide variety of functionality, including importing reference data, mapping reference data to ERP databases, calculating product footprint, providing auditing functionality, and the like.

Although the term "product footprint" is used herein, such term is intended to cover both products proper as well as services (e.g., the service is the product).

Example 10—Example Geographical Indications

In any of the examples herein, geographical indications can be used to indicate where a reference emission factor is valid. For example, the factor may vary based on the country, region, or the like. An emission factor can vary greatly depending on the location. For example, cocoa production in one country may result in a different emission factor than cocoa production in another country due to a variety of reasons.

The intelligent mapping can support indications that span multiple countries (e.g., a wildcard, a region, or the like). Other indicators such as "RoW" (rest of the world) can be supported so that a single country or region can be specified along with "rest of the world" to indicate that the factor is for any location except the specified country or region.

Subsequently, when footprint analysis is performed, a reference emission factor that matches the geographical location for which the footprint is calculated can be chosen and applied. The geographical location can be drawn from the ERP database or specified manually as part of the footprint analysis process.

Example 11—Example Sources of Sustainability Impact

Figure 5:
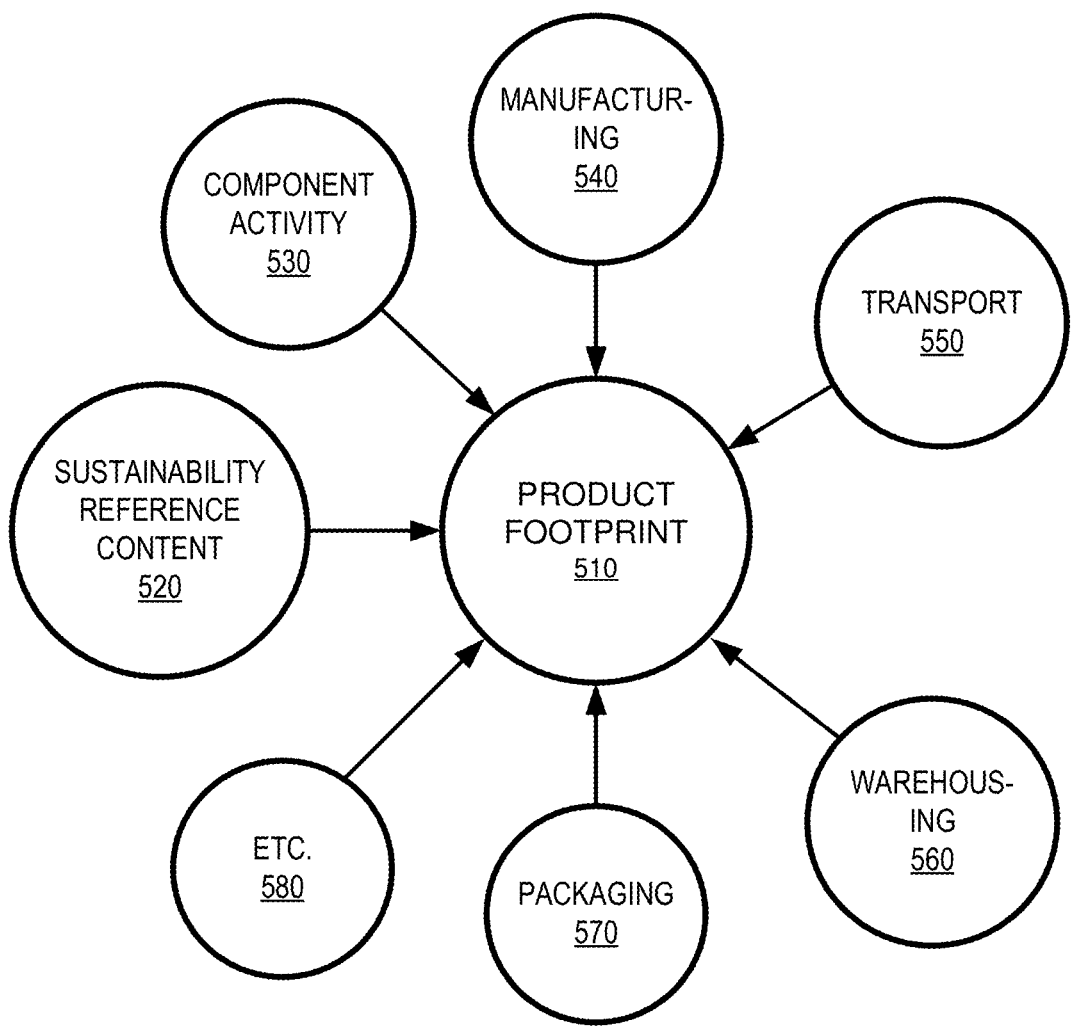
FIG. 5 is a block diagram of examples sources of sustainability impact for product footprint analysis.

FIG. 5 is a block diagram of example sources 500 of sustainability impact for product footprint analysis 510. As shown, a variety of factors can be incorporated into the analysis 510. Component activity 530 can include a wide variety of activity related to components of the product (e.g., ingredients, materials, or the like). Manufacturing impact 540, transport impact 550, warehousing 560, packaging 570, and other impacts 580 can be included.

As shown sustainability reference content 520 (e.g., comprising emission factors) can be used to calculate any of the impacts shown. For example, for transport 550, the mode of transport as well as the reference emission factor in combination with the distance traveled can be used to calculate product footprint. The reference content can specify mode of transport and reference emission factor. The distance traveled can come from or be derived from an ERP database (e.g., the distance between source and destination). Multiplication by the proper emission factor results in the product footprint calculation for the transport impact. In practice, the other impacts can be aggregated, resulting in a combined footprint.

Footprint calculation can be done for different footprint categories like the publicly known Carbon Footprint for Greenhouse Gases (GHG), water consumption or land fill needs. The Greenhouse Gas Protocol specifies a framework for footprint calculations. Scope can include direct and indirect impacts, including upstream activities, reporting company activities, and downstream activities.

For example, purchase of electricity, steam, heating, and cooling for use are example indirect upstream activities that can be included within a scope of level 2.

Purchased goods and services, capital goods, fuel and energy related activities, transformation and distribution activities, waste generated in operations, business travel, employee commuting, and leased assets can be upstream indirect activities within a scope of level 3.

Direct activities within a scope of level 1 can include company facilities, company vehicles, and the like.

Indirect downstream activities within a scope of level 3 can include transformation and distribution, processing of products, use of sold products, end-of-life treatment of sold products, leased assets, franchises, investments, and the like.

The Greenhouse Gas Protocol, specifically the Product Lifecycle Standard, provides a general model for $CO_2$ footprint calculation.

Impacts can include $CO_2$, $CH_4$, $N_2O$, HFCs, PFCs, $SF_6$, $NF_3$, and the like.

In general, a typical enterprise purchases materials from various suppliers (e.g., scope 3), uses electricity and/or fuel energy sources for manufacturing operations (e.g., scope 2), converts raw materials to finished or semi-finished products (e.g., scope 1), and sells finished products to customers (e.g., scope 3) or provides a service to customers (e.g., scope 1, 2).

In the value addition process, the enterprise emits greenhouse gases, utilizes natural capital like potable water, land, and the like. Any raw material, be it agricultural/farm products or a semi-finished product brings its share of greenhouse gases such as Carbon Dioxide ($CO_2$) and methane. The footprint of greenhouse gases depends upon the processes employed. Some organizations use eco-friendly equipment and emission-friendly processing technologies.

For example, in a utility company, electrical energy may come from clean sources like a solar power station, windmills, or a hydro power plant, or from unclean sources like a thermal power plant. Depending upon the source, the carbon footprint per watthour of energy produced varies.

Depending upon the production processes and technology/machinery in use, the enterprise may have higher or lower emissions of greenhouse gases. In addition, activities like employee commute, business travel, office climate control, warehouse cooling requirements, and the like bring their share of energy usage or emissions of greenhouse gases.

Example 12—Example Integration into ERP Software

The technologies described herein can be implemented into an industry agnostic and efficient footprint calculation based on real-time business data located in ERPs such as SAP S/4HANA or others.

In any of the examples herein, the technologies can be integrated into enterprise resource planning ("ERP") software. For example, a footprint management application can operate in an SAP S/4HANA environment or other ERP software that stores relevant data for an enterprise, providing access to product-related data relevant for calculating a product footprint.

The technologies described herein can be integrated into the Business Technology Platform of SAP as a service to assist in mapping.

Example 13—Example Product Footprint Metric Calculation

Figure 6:
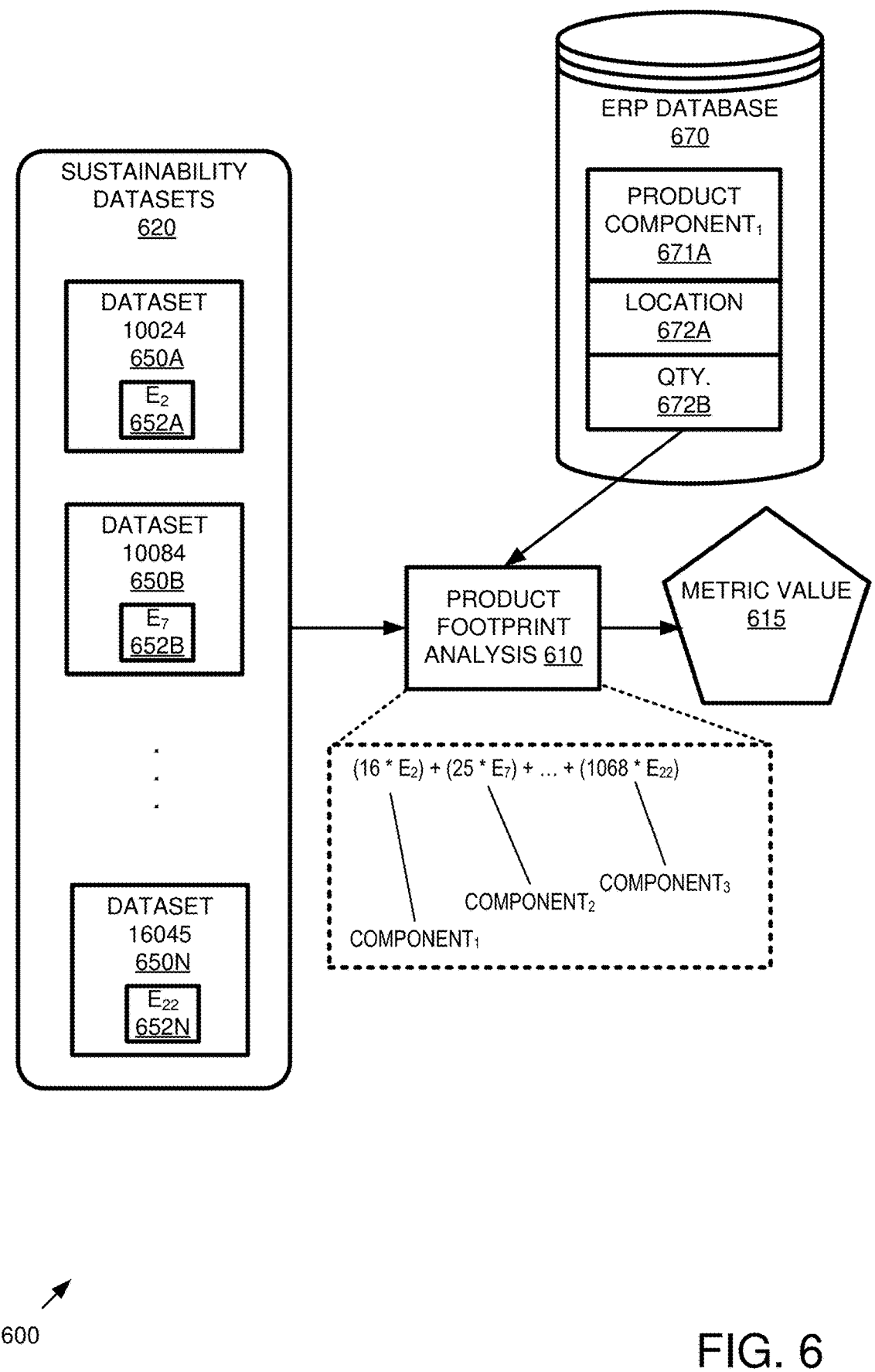
FIG. 6 is a block diagram showing an example of calculating a product footprint metric.

FIG. 6 is a block diagram showing an example system 600 calculating a product footprint metric 615 using sustainability datasets 620 and can be used in any of the examples herein. In the example, product footprint analysis 610 accepts the sustainability datasets 620, including dataset 650A with emission factor 652A, dataset 650B with emission factor 652B, and dataset 650N with emission factor 652N. Metadata can be included to indicate information about source of the data, validity dates, versioning information, and the like.

The ERP database 670 can include information about products and their constituent product components. In the example, information for a single product component 671A is shown. Information about location 672A and quantity 672B can be included. As described herein, the product component 671A in the ERP database 670 can be mapped to a sustainability dataset 650A that comprises an emission factor 652A. Calculations for the product component can then proceed by summing the environmental impacts of the product components. The quantities of each component can be multiplied by respective emission factors.

In practice, the calculation can be more complex, accounting for different activities, such as production, transport, warehousing, and the like. Thus, the data 620 can include reference emission factors for a plurality of different product components, activities, and the like.

The datasets 650A-N can comprise one or more reference emission factors 652A-N. In practice, geographical indications can be included that enable downstream processing to choose a reference emission factor correlated with a particular geographical location (e.g., manufacturing or transportation in region A may have a different impact that manufacturing or transportation in region B).

A wide variety of other information can be included such as the footprint calculation method used, the environment category, and the like, as described herein.

As shown, the information from an ERP database 670 such as geographical location 672A, quantity 672B, and the like can be used to choose among reference emission factors or be incorporated into the calculation itself (e.g., as a factor in multiplication, threshold analysis, or the like).

As shown, the calculation can combine (sum) impacts (e.g., material, transport, warehousing, and the like) to calculate a metric value 615, which is typically specified in units (e.g., $CO_2e$ or the like). In the example, quantity 672B and location 672A are incorporated into the calculation.

For example, a quantity can specify a distance (e.g., miles, kilometers), amount of a component (e.g., mass of material), square feet (e.g., for warehouse space), or the like. The criteria for mapping to a reference emission factor can include geography (e.g., the product is stored in a specified location), component name (e.g., the reference factor is for a specified material, and quality (e.g., the computation is required to be of a specified accuracy, based on information that complies with a specified standard, or the like). Such criteria can be drawn from the ERP database 670 or specified as part of the calculation criteria (e.g., in a user interface of a product footprint management application that performs the analysis 610).

Example 14—Example Searching

FIG. 7 is a block diagram of an example system 700 implementing sustainability content searching that can be implemented in any of the examples herein describing search to achieve intelligent mapping.

In the example, a sustainability content matching engine 760 is configured to receive configurable attribute mappings 720 (sometimes called "rules"). Such mappings can map an attribute name (e.g., of product component attribute) of product information in an ERP database to an attribute name of the emission dataset records. As described herein, such a mapping can be between a commodity code available in both the ERP and sustainability datasets. For example, a commodity code attribute from the ERP database can be mapped to an HS code attribute from sustainability content. Other mappings can be from a supplier country attribute to a reference location field in the sustainability content. Other attribute mappings are possible.

Such an approach can avoid the process of having to individually map a record from one dataset to a record of another dataset. Instead, bulk mapping is achieved by specifying an attribute mapping that results in plural dataset mappings. Such configurable attribute mappings are sometimes called "rules" because they can optionally include conditions. For example, IF BAM.ComodityCode=SC.ClassificationValue AND BAM.SupplierCountry=SC.ValidityLocation THEN SustainabilityContentSourceId=PU003

The ContentSourceId can specify a single emission factor or more than one from which an additional selection can be made.

As described herein, the mappings 720 can achieve multiple, variable levels of granularity by specifying fallback mappings.

The engine 760 is also configured to receive an indication of the product component in the form of component attributes 730 (e.g., from the product component record that is being mapped). The engine 760 also has access to the emission database 740, which is searched for a matching dataset record.

The engine 760 can also be configured to receive attribute weights 750, which specify that some attributes should take greater weight during matching.

In practice, the engine receives the incoming product component information 730 and searches for a match in the emission database based on matches between the attributes as specified in the mappings (e.g., a match between a product description in the product component attributes and the product component attributes in the emission database 740). One or more emission data records 770 are then returned and proposed for mapping. Fuzzy text searching can be implemented so that inexact matches are also returned. Returned matches can have an associated relevance score so that they can be ranked when presented for confirmation (e.g., the confirmed match is selected in a user interface).

In practice, a wide variety of rich functionality can be provided to perform the search, and tools can be provided to help filter, sort, or otherwise navigate through results (e.g., in case there are many results). For example, a filter or sort on geographical location can be helpful during mapping.

Example 15—Configurable Attribute Mapping

In any of the examples herein, configurable attribute mapping can be supported for use during search. In an attribute mapping scenario, the product component record comprises a plurality of product component attributes, and the emission dataset records (which can be logical records as described herein) comprise a plurality of emission dataset attributes. Configurable attribute mappings relate at least one of the product component attributes (an attribute name) to at least one of the emission dataset attributes (an attribute name that may or not match that specified for the product component). Searching can then incorporate the pre-configured attribute mappings (e.g., finding matches between the two attributes when there are matching values for the attribute names).

Such attribute mappings can be configurable, and, in a machine learning scenario, such mappings can be learned, predicted, and applied to reduce the amount of manual configuration.

As described herein, fallback attribute mappings can also be specified. When configurable attributes comprise one or more fallback mappings, at least one of the fallback mappings can be applied after failure of a higher-level mapping as described herein.

Example 16—Example Level of Granularity

Figure 8:
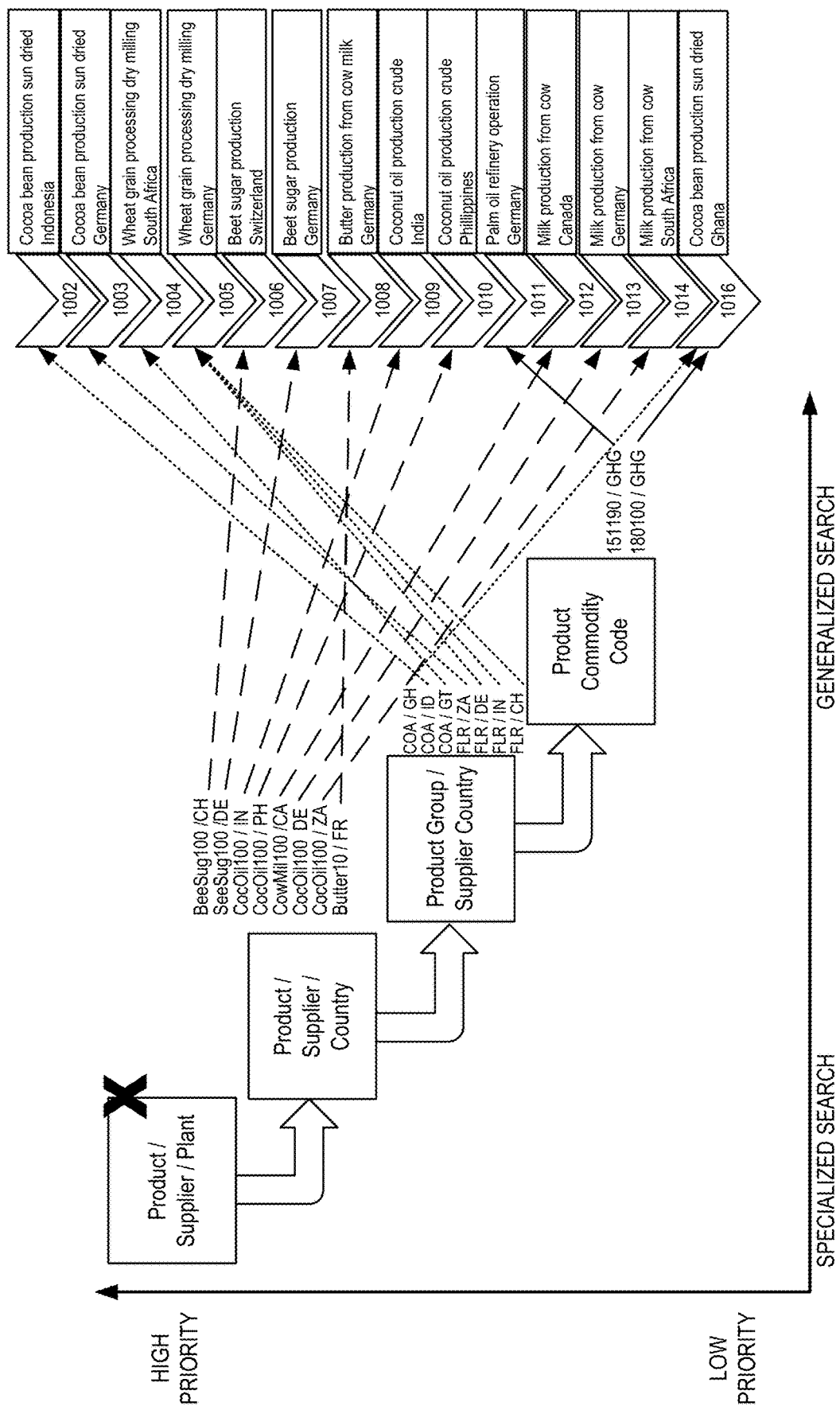
FIG. 8 is a block diagram showing example searching at different levels of granularity via fallback attribute mapping for search.

FIG. 8 is a block diagram showing example searching 800 at different levels of granularity via fallback attribute mapping during search for an emission factor in the reference sustainability content. In an ideal setting, matching would be between product supplier and plant (i.e., the reference sustainability content dataset matches the product supplier and plant in the product component database). However, as a practical matter, such information is typically unavailable. Accordingly, a match on product and supplier country can be performed, which may be considered a sufficient match.

However, in some cases, such a match is unavailable. Accordingly, a fallback attribute mapping of product and supplier country can be used (e.g., a match between product and supplier country attributes in both databases). If such a match is unavailable, then a fallback attribute mapping of product group and supplier country can be used. And, if such a match is unavailable, a fallback attribute mapping of product commodity code can be used. In practice, a portion (e.g., segment) of the entire product commodity code can be used as described herein.

In case of complete failure, manual search may need to be performed.

Example 17—Example Method of Fallback Attribute Mapping

Figure 9:
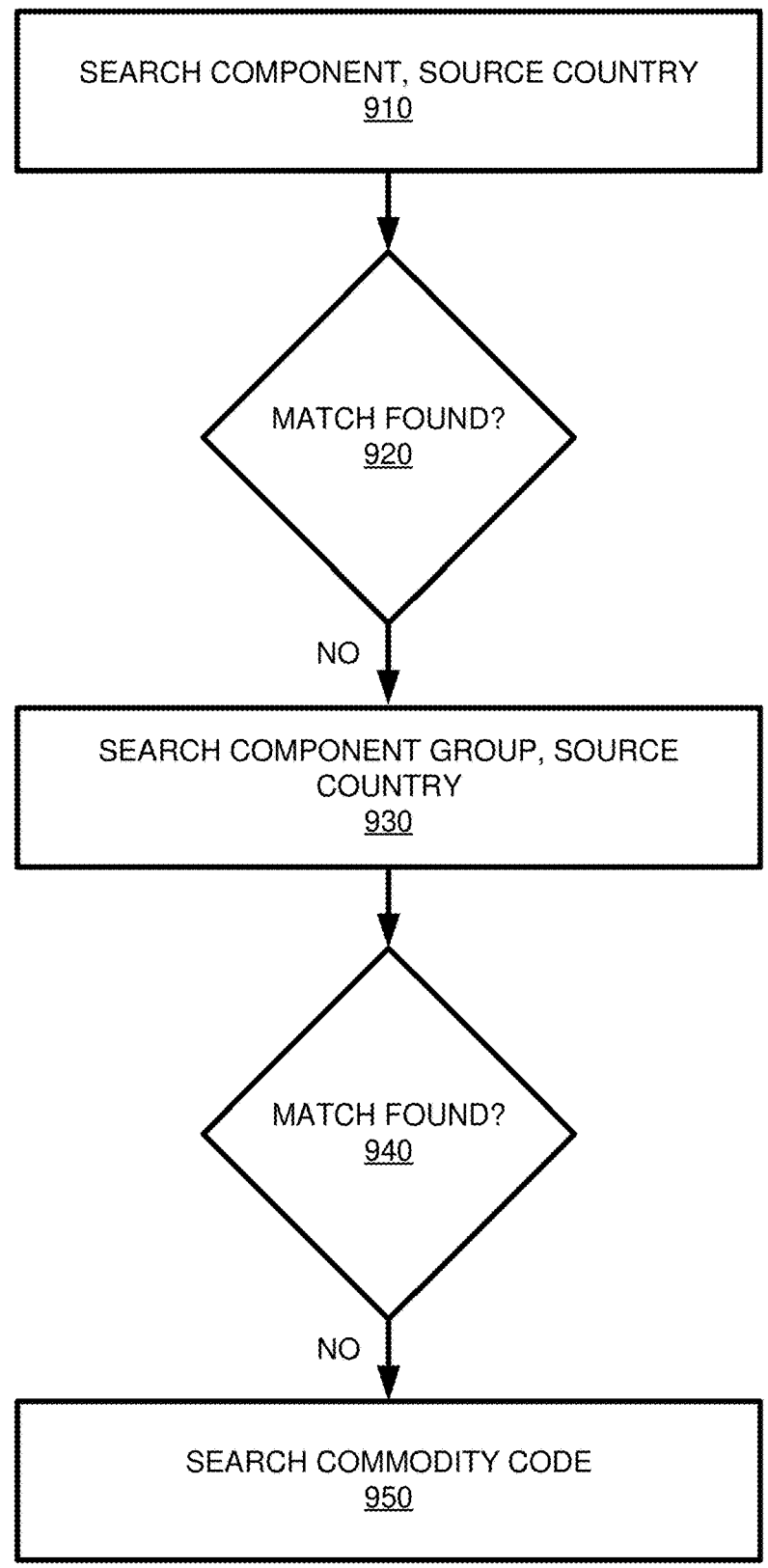
FIG. 9 is a flowchart of an example method of searching at different levels of granularity via fallback attribute mapping for search.

FIG. 9 is a flowchart of an example method 900 of searching at different levels of granularity via fallback attribute mapping for search.

In the example, at 910, a search is performed via a match between search component attributes and source country attributes. Such match(es) can then be used as proposed mapping(s). If no match is found at 920, a search can proceed at 930 with the fallback attribute mapping of component group and source country.

If no match is found at 940, then at 950 the search of the reference sustainability reference datasets can proceed using commodity code. Again, matches can be used as proposed mapping(s).

Example 18—Example Semantic Segmentation

Figure 10:
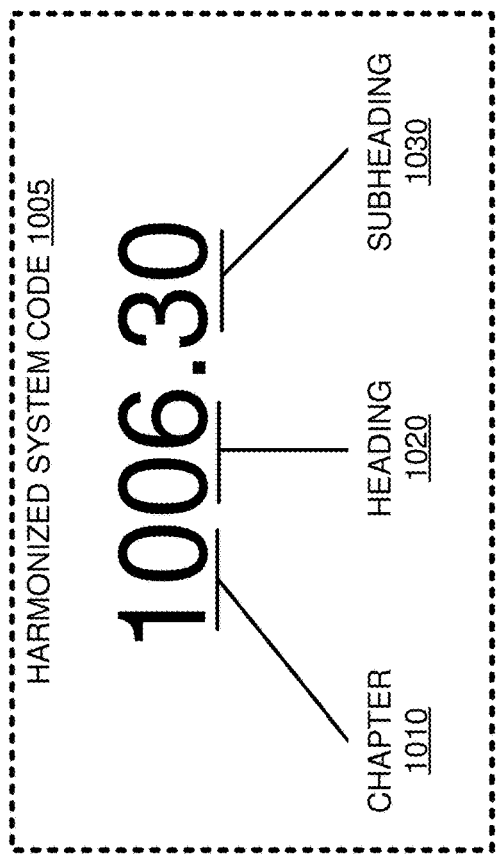
FIG. 10 is a block diagram of example semantic segmentation of a generated item component code.

FIG. 10 is a block diagram of example semantic segmentation 1000 of a product component code 1005. For example, in any of the examples herein, when searching on a commodity code attribute (e.g., trying to find the commodity code of a product component in the reference sustainability content), semantic segmentation can be used. In the example, the harmonized system code 1005 can be used. In practice, a match between chapter 1010, heading 1020, or subheading 1030 can be used. For example, instead of a complete match, a match between chapter 1010 and heading 1020 may be sufficient, and the matching reference sustainability content dataset with emission factor can be returned as a proposed mapping.

Example 19—Example Product Component Attributes

Figure 11:
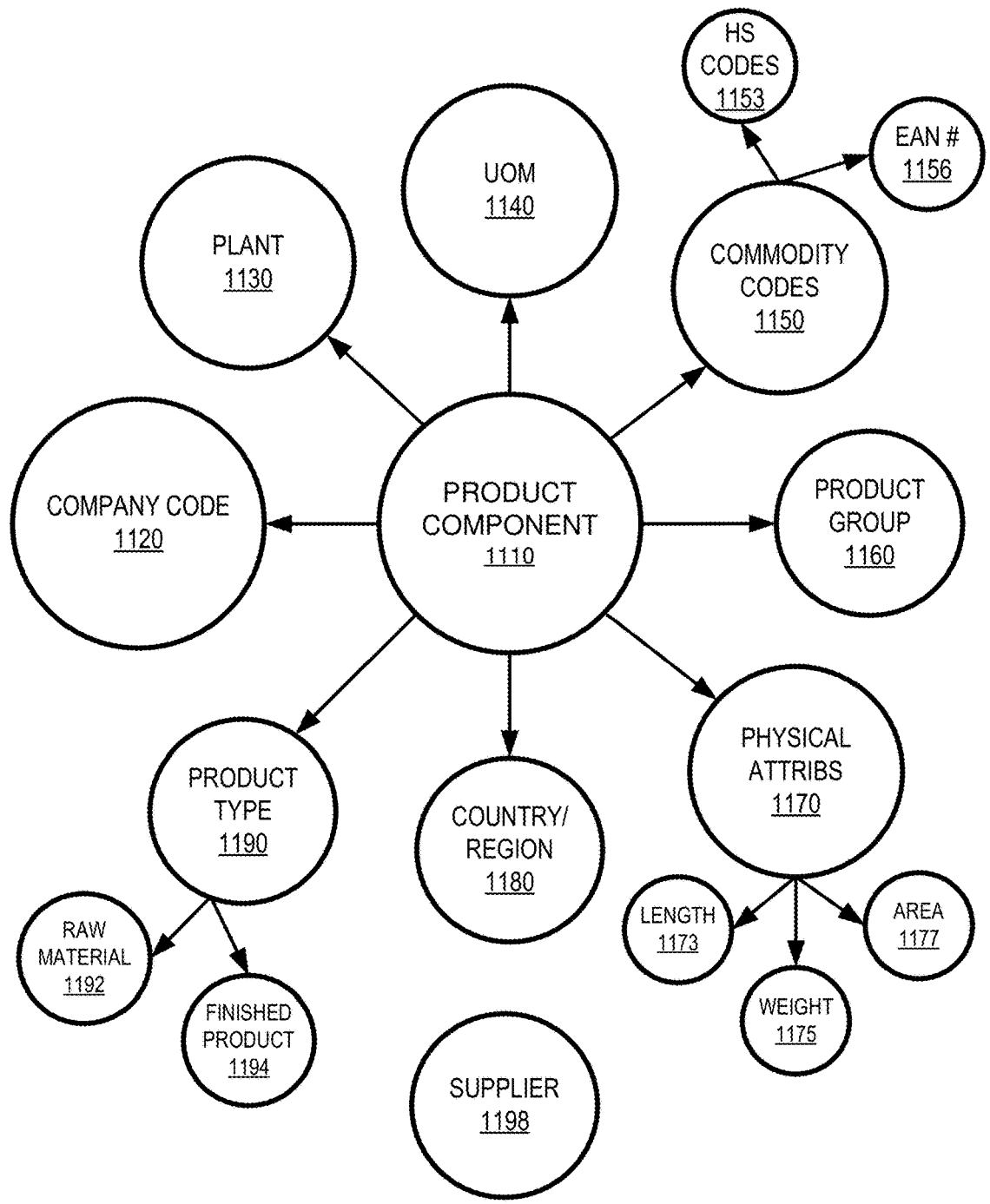
FIG. 11 is a block diagram of example product component attributes.

FIG. 11 is a block diagram of example product component attributes 1100 (sometimes called "categories") that can be maintained as part of product master data. In practice matches in reference sustainability content are searched using such attributes. As described herein, some attributes can be weighted greater than others. In some cases, some attributes may not be available, so searching is often not a simple task.

Attributes of the product component 1110 include company code 1120, plant 1130, unit of measurement 1140, commodity codes 1150 (e.g., whether HS codes 1153, EAN number 1156, or both), product group 1160, physical attributes 1170 (e.g., whether length 1173, weight 1175, areas, 1177, or combinations thereof), country/region 1180, and product type 1190 (e.g., whether raw material 1192 or finished product 1194). A supplier 1198 can also be included, from which other attributes can sometimes be derived (e.g., based on geographical location).

In practice, most products have only a fixed number of attributes with unique values. For example, product type 1190 attributes can have only a fixed set of predefined values (e.g., raw materials 1192, finished products 1194, etc.).

In addition, product classifications can be stored that are a very detailed and accurate way to identify a product and use it to map to relevant emission factors.

Example 20—Example Mapping Tool Architecture

Figure 12:
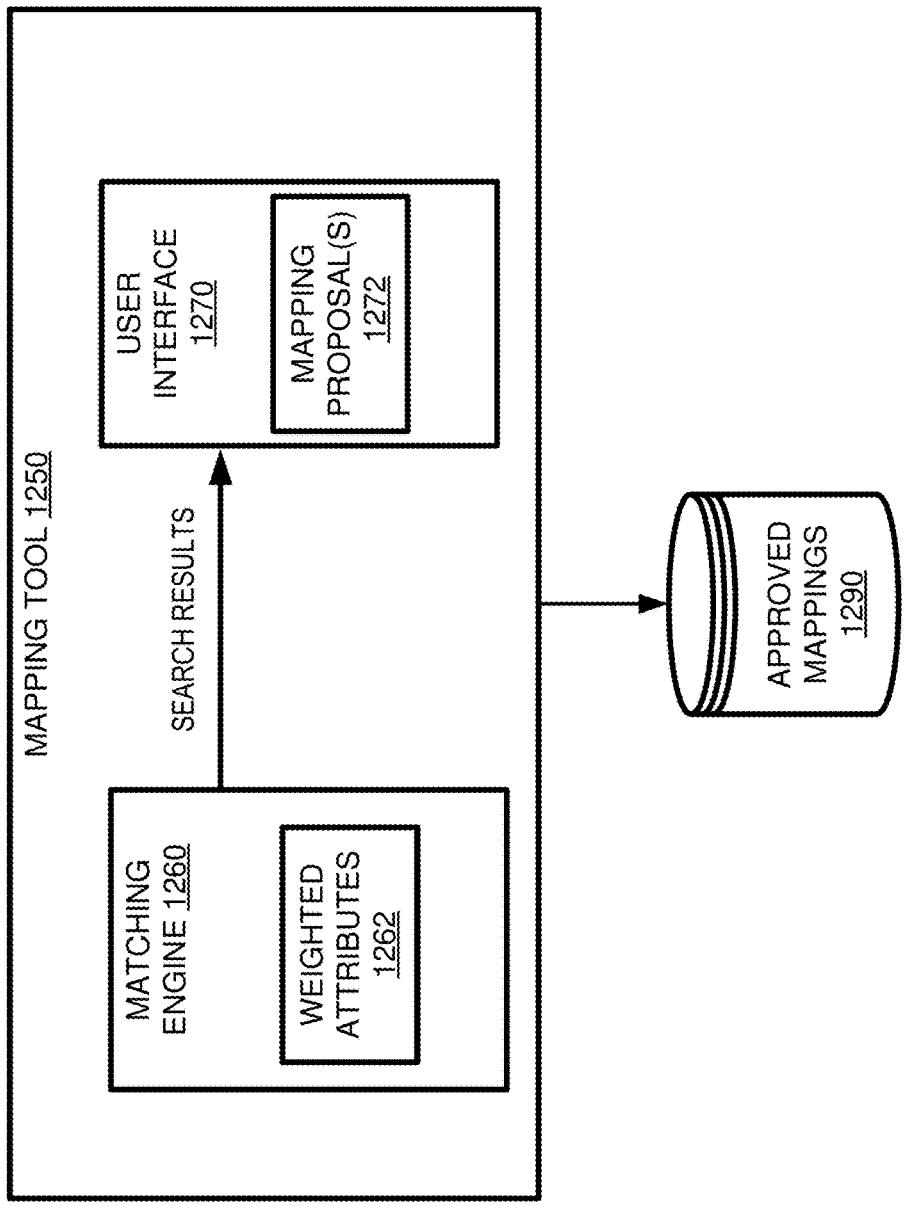
FIG. 12 is a block diagram of an example mapping tool.

FIG. 12 is a block diagram of an example mapping tool system 1200.

In the example, the tool 1250 comprises a matching engine 1260 with weighted attributes 1262 that provides search results to a user interface 1270 that presents them as mapping proposals 1272. Confirmed mappings 1290 can be generated as a result of user interface input.

Example 21—Example Training Process

Figure 13:
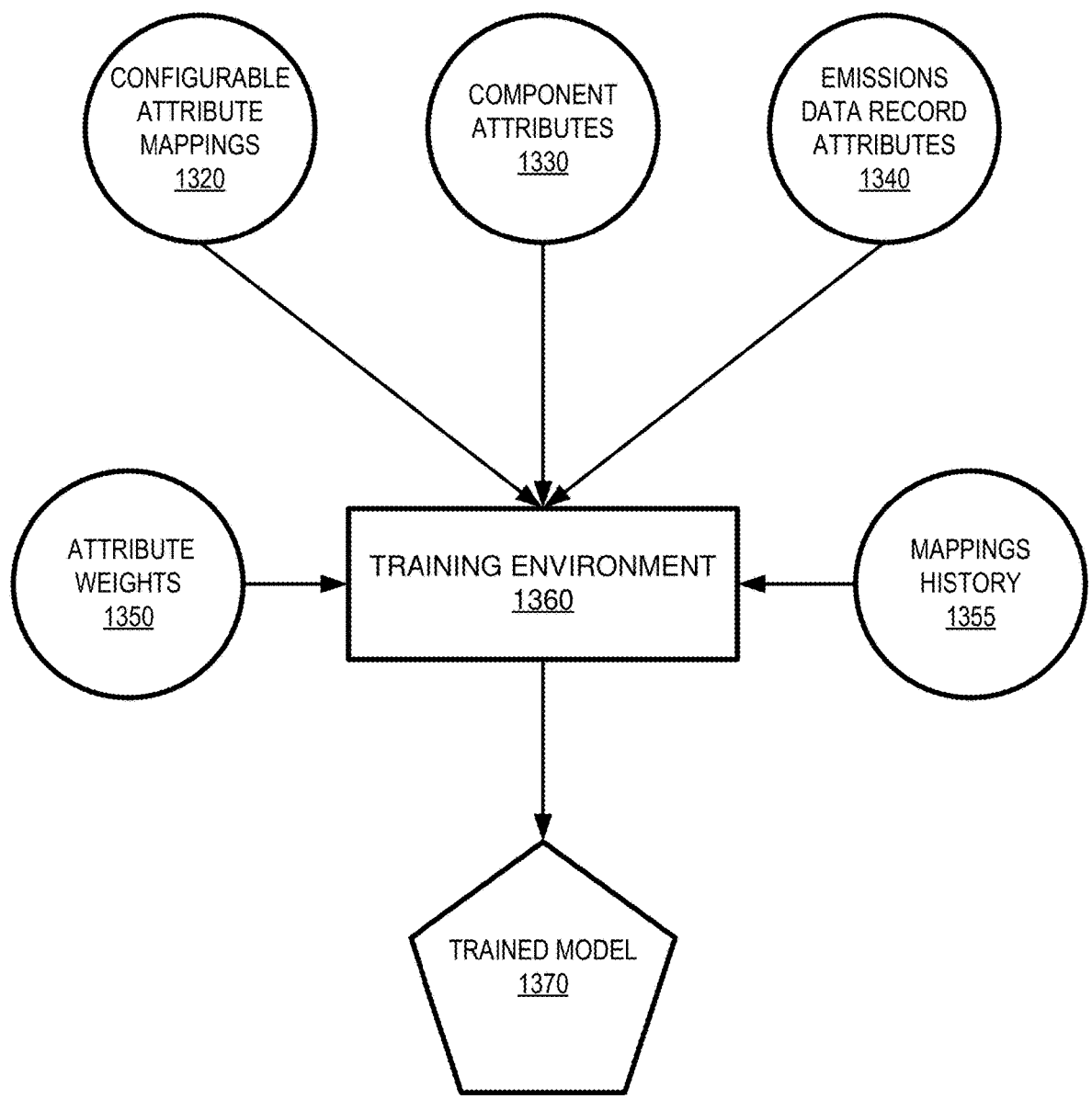
FIG. 13 is a block diagram of an example system implementing training a model for mapping.

FIG. 13 is a block diagram of an example system 1300 implementing training a model 1370 for mapping.

In the example, the training environment 1360 receives configurable attribute mappings 1320, component attributes 1330 from product component records and matching emissions data record attributes 1340.

The training environment can also accept attribute weights 1350 and mappings history 1355, which can include both hard, one-to-one mappings and rules. For example, a rule can be recast as one or more confirmed mappings.

The result of the training process is a trained model 1370. The trained model is operable to receive a product component record and generate one or more proposed matching sustainability content dataset records (e.g., with respective confidence scores). A threshold can be set so that a proposed record that meets an auto-confirmation threshold is automatically confirmed and mapped. Others below the threshold can be presented for confirmation.

Another level of training is to predict attribute mappings or rules instead of individual records. In this way, the model 1370 can automate the process of rule creation.

Similarly, training can be done on attribute mapping to predict attributes in product component records to be mapped to sustainability dataset records.

Training data can be drawn from sources such as reusing data from internal as well as external data to determine what kind of master data and enterprise data as well as physical goods movement data can be incorporated. Cross-tenant data can be supported if consent and anonymization are enforced. For example, training data can comprise confirmed emission dataset records from (e.g., confirmed by) a plurality of different tenants.

Publicly available emission factors data sets can be used to train recognition, extraction, and mapping of sustainability factors to product data. Pre-mapped datasets can be prepared on an industry-specific industry such as Oil and Gas, Consumer Products, Retail, Manufacturing, and the like.

Training data and pre-trained machine learning models can be provided, but actual enterprise data can be provided via a product footprint management tool. After the enterprise starts using the product footprint management tool, and feeds live product data that needs to be mapped to emission factors, the actual mapping data can be created.

From the machine learning perspective, two tasks can be executed. First, classifying the enterprise data set using different attributes of the products as shown in FIG. 11. A K-nearest neighbor approach can be used.

Second, after classification is done, it can be matched to the relevant emission factor record to make an automated mapping proposal that can be reviewed and finalized in a user interface. An association algorithm such as Apriori, Sequential Pattern Mining, and the like can be used.

There are multiple ways to implement such approaches. A Predictive Analysis Library (PAL) or the like can run the analysis. Or, the analysis can be implemented in a programming language (e.g., R or the like), and it can be integrated. Or, learning services such as SAP Leonardo or the like can be used.

The result of a condition matching engine can be rules that have been automatically generated to map the enterprise's product data with the sustainability content brought into the system, at different levels of granularity. The rules can then be used in footprint calculations at scale to derive the footprints for enterprise products and processes.

Example 22—Example Further Machine Learning Techniques

Classifier algorithms can be used that support high cardinality and multi-class classification. Typical technologies include decision tree-based ensemble classifiers (boosted or bagged), support vector machines, neural networks, XGBoost, or the like.

Example 23—Example User Interface

FIGS. 14, 15, and 16 are screenshots of a user interface for implementing intelligent machine learning-based mapping for footprint and can be used in any of the examples herein.

FIG. 14 shows a user interface 1400. The download template option can include downloading a template with no data or downloading a template prefilled with product component records from the ERP database. In a machine learning scenario, some of the emission factors can be filled in (e.g., with a confidence score).

FIG. 15 shows a user interface 1500 presenting a ranked list of proposals from which a user can select one for mapping. Assisted search can be performed via one or more filters. If there are numerous results, such filters can be helpful. Various additional tools are presented to help navigate the results. As shown, a warning 1510 can be presented on the search results user interface when fallback attribute mapping is used to make a recommendation (e.g., "No Emission Dataset found for Coca Powder").

FIG. 16 shows a user interface 1600 comprising indications of the product components with mapped dataset records (e.g., "Source ID") shown as filled in after confirmation. A Package ID and Dataset Version are also shown for reference.

Example 24—Example Validity Time Window

Figure 17:
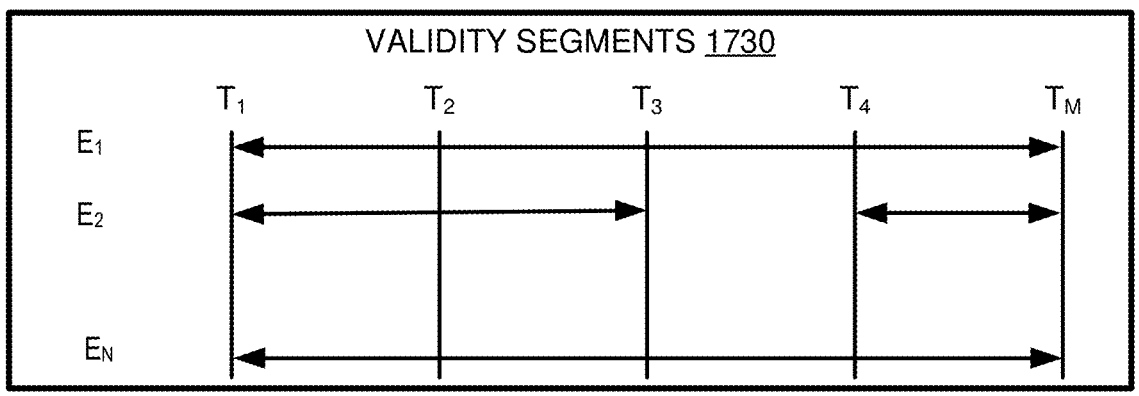
FIG. 17 is a block diagram of an example validity time window implementation for emission factors.

FIG. 17 is a block diagram of an example validity time window implementation 1700 for emission factors and can be used in any of the examples herein. In the example, time segments 1730 are specified for various of the emission factors. When calculating footprint, the validity time window can be taken into account. For example, if the data is expired or if the calculation is being done for a time period outside of the window, the reference emission factor can be excluded from the calculation. An alert regarding expiration can be raised, or other data (e.g., from a fallback mapping) can be used instead.

Example 25—Example Implementations

Clause 1. A computer-implemented method comprising:
receiving an indication of a created item component represented in a database as a created item component record;
performing a search against a plurality of emission dataset records for an emission dataset record corresponding to the created item component;
returning search results comprising one or more found emission dataset records out of the plurality of emission dataset records;
presenting the one or more found emission dataset records in a user interface for confirmation;
receiving a selection of a confirmed emission dataset record out of the one or more found emission dataset records; and
creating a mapping between the created item component record and the confirmed emission dataset record.

Clause 2. The method of Clause 1 wherein:
wherein the search weights at least one attribute higher than another during the search.

Clause 3. The method of Clause 2 wherein:
the search weights a classification code attribute and a description attribute more highly than other attributes.

Clause 4. The method of any one of Clauses 1-3 wherein:
the created item component record comprises a plurality of created item component attributes;
the emission dataset records comprise a plurality of emission dataset attributes;
configurable attribute mappings relate at least one of the of created item component attributes to at least one of the emission dataset attributes;
and the search incorporates the configurable attribute mappings.

Clause 5. The method of Clause 4 wherein:
the configurable attribute mappings comprise one or more fallback attribute mappings; and
the method further comprises:
applying at least one of the fallback attribute mappings after failure of a higher-level mapping.

Clause 6. The method of Clause 5 wherein:
the configurable attribute mappings comprise a mapping of created item and provider country and a fallback mapping of created item group and provider country.

Clause 7. The method of any one of Clauses 5-6 wherein:
the configurable attribute mappings comprise a fallback mapping of commodity code or a portion of commodity code.

Clause 8. The method of any one of Clauses 1-7 wherein:
the search maps a created component attribute name of the database to an attribute name of the emission dataset records according to a configurable attribute mapping.

Clause 9. The method of Clause 8 wherein:
the configurable attribute mapping maps a provider country attribute of the created item component record to a provider country attribute of the emission dataset records.

Clause 10. The method of any one of Clauses 1-9 further comprising:
configuring a hard mapping rule; and
applying the hard mapping rule during footprint calculations.

Clause 11. The method of any one of Clauses 1-10 further comprising:
performing assisted search via one or more filters.

Clause 12. The method of any one of Clauses 1-11 wherein:
the search is based on the following attributes:
geographical location;
one or more created item component classification codes; and
a textual description of the created item component.

Clause 13. The method of any one of Clauses 1-12 further comprising:
segmenting a classification code into a sub-segment of an entire code; and
applying the sub-segment during the search.

Clause 14. The method of any one of Clauses 1-13 further comprising:
for a logical record, determining when to map to a rest-of-the-world dataset based on absence of a specific country in any parallel dataset within the plurality of emission dataset records.

Clause 15. The method of any one of Clauses 1-14 further comprising:
monitoring selection of a confirmed emission dataset record selected by a user interface;

incorporating features of the confirmed emission dataset record into a training record; and training a machine learning model with training data comprising the training record.

Clause 16. The method of Clause 15 wherein:

the training data comprises confirmed emission dataset records from a plurality of tenants.

Clause 17. The method of any one of Clauses 15-16 wherein:

the training weights in favor of the following features:
geographical location;
one or more created item component classification codes; and
a textual description of the created item component.

Clause 18. The method of any one of Clauses 15-17 further comprising:

recasting previous rules as synthesized search results; and
incorporating the synthesized search results into the training data.

Clause 19. A computing system comprising:
at least one hardware processor;
at least one memory coupled to the at least one hardware processor; and
one or more non-transitory computer-readable media having stored therein computer-executable instructions that, when executed by the computing system, cause the computing system to perform:
receiving an indication of a created item component represented in a database as a created item component record;
performing a search against a plurality of emission dataset records for an emission dataset record corresponding to the created item component, wherein the search weights a classification code attribute and a description attribute;
returning search results comprising one or more found emission dataset records out of the plurality of emission dataset records;
presenting the one or more found emission dataset records in a user interface for confirmation;
receiving a selection of a confirmed emission dataset record out of the one or more found emission dataset records; and
creating a mapping between the created item component record and the confirmed emission dataset record.

Clause 20. One or more non-transitory computer-readable media comprising computer-executable instructions that, when executed by a computing system, cause the computing system to perform operations comprising:
receiving an indication of a created item component represented in a database as a created item component record;
performing a search against a plurality of emission dataset records for an emission dataset record corresponding to the created item component, wherein the search weights a classification code attribute and a description attribute;
returning search results comprising one or more found emission dataset records out of the plurality of emission dataset records;
presenting the one or more found emission dataset records in a user interface for confirmation;
receiving a selection of a confirmed emission dataset record out of the one or more found emission dataset records;

training a machine learning model with training data comprising a mapping between the created item component record and the confirmed emission dataset record; and
predicting with the trained machine learning model a new mapping between a new created item component record and a new emission dataset record.

Clause 21. One or more computer-readable media having encoded thereon computer-executable instructions that, when executed by a computing system, cause the computing system to perform the method of any one of Clauses 1-17.

Example 26—Example Advantages

A number of advantages can be achieved via the technologies described herein. For example, because attribute mappings can be supported, tedious individual mapping between records can be avoided. Further, attribute mapping allows automated search to be performed in scenarios where attribute names do not match. Also, because fallback attribute mappings can be supported, greater mapping coverage can be provided when an ordinary mapping would fail.

Further, a machine learning approach can fill in gaps left by other approaches to further reduce manual workload.

As a result, emission factors can be made available for a wide variety of product components, enabling product footprint management to actually take place, instead of being stuck in the bottleneck of the mapping process.

Further, avoiding manual entry avoids errors due to typographical errors or misunderstanding of data models.

Example 27—Example Computing Systems

Figure 18:
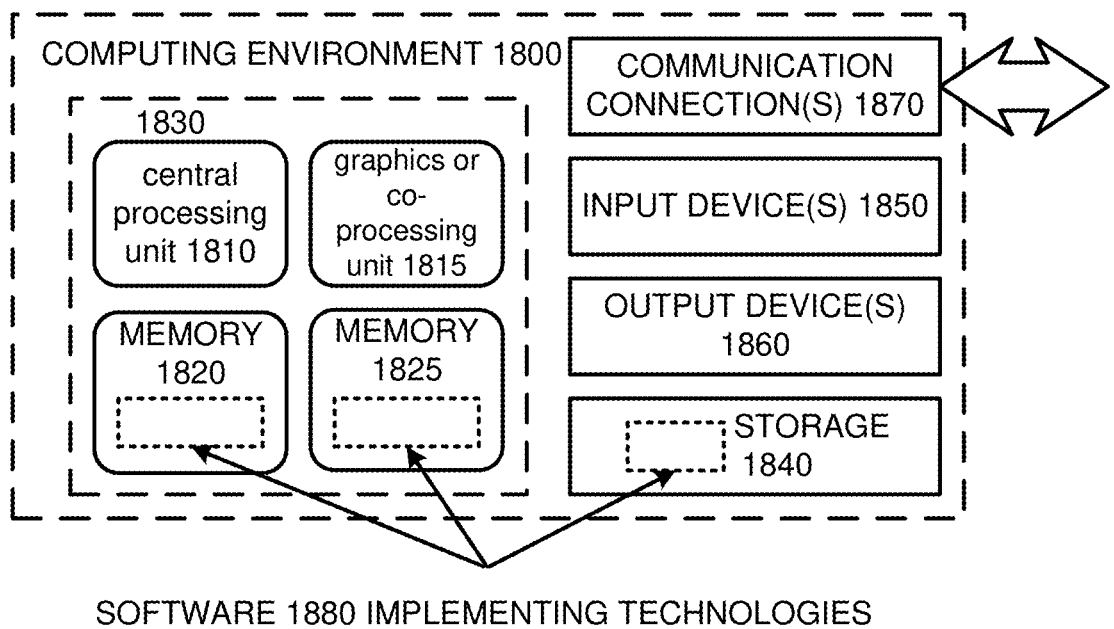
FIG. 18 is a block diagram of an example computing system in which described embodiments can be implemented.

FIG. 18 depicts an example of a suitable computing system 1800 in which the described innovations can be implemented. The computing system 1800 is not intended to suggest any limitation as to scope of use or functionality of the present disclosure, as the innovations can be implemented in diverse computing systems.

With reference to FIG. 18, the computing system 1800 includes one or more processing units 1810, 1815 and memory 1820, 1825. In FIG. 18, this basic configuration 1830 is included within a dashed line. The processing units 1810, 1815 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 18 shows a central processing unit 1810 as well as a graphics processing unit or co-processing unit 1815. The tangible memory 1820, 1825 can be volatile memory (e.g., registers, cache, RAM), non-volatile memory (e.g., ROM, EEPROM, flash memory, etc.), or some combination of the two, accessible by the processing unit(s) 1810, 1815. The memory 1820, 1825 stores software 1880 implementing one or more innovations described herein, in the form of computer-executable instructions suitable for execution by the processing unit(s) 1810, 1815.

A computing system 1800 can have additional features. For example, the computing system 1800 includes storage 1840, one or more input devices 1850, one or more output devices 1860, and one or more communication connections 1870, including input devices, output devices, and communication connections for interacting with a user. An interconnection mechanism (not shown) such as a bus, controller, or network interconnects the components of the computing system 1800. Typically, operating system software (not shown) provides an operating environment for other software executing in the computing system 1800, and coordinates activities of the components of the computing system 1800.

The tangible storage 1840 can be removable or non-removable, and includes magnetic disks, magnetic tapes or cassettes, CD-ROMs, DVDs, or any other medium which can be used to store information in a non-transitory way and which can be accessed within the computing system 1800. The storage 1840 stores instructions for the software 1880 implementing one or more innovations described herein.

The input device(s) 1850 can be an input device such as a keyboard, mouse, pen, or trackball, a voice input device, a scanning device, touch device (e.g., touchpad, display, or the like) or another device that provides input to the computing system 1800. The output device(s) 1860 can be a display, printer, speaker, CD-writer, or another device that provides output from the computing system 1800.

The communication connection(s) 1870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 28—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 29—Example Cloud Computing Environment

Figure 19:
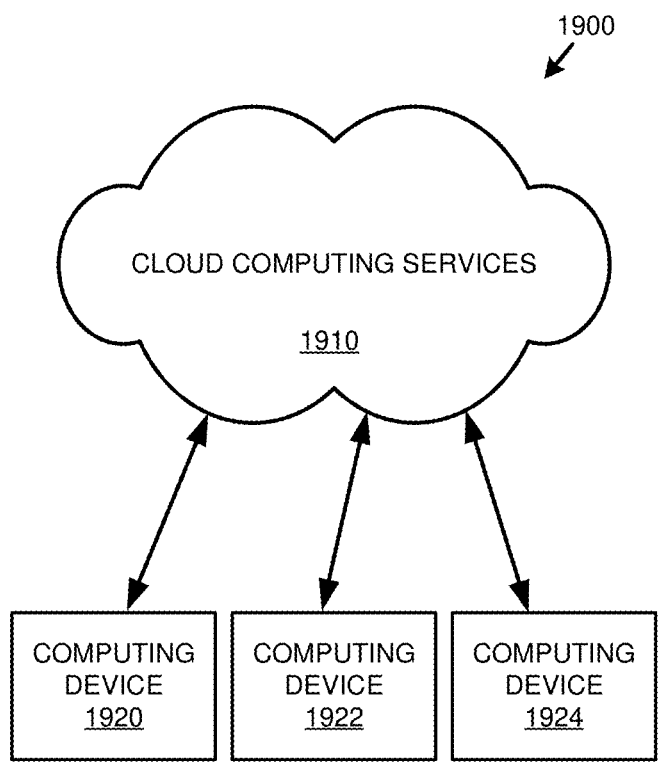
FIG. 19 is a block diagram of an example cloud computing environment that can be used in conjunction with the technologies described herein.

FIG. 19 depicts an example cloud computing environment 1900 in which the described technologies can be implemented, including, e.g., the system 200 of FIG. 2 and other systems herein. The cloud computing environment 1900 comprises cloud computing services 1910. The cloud computing services 1910 can comprise various types of cloud computing resources, such as computer servers, data storage repositories, networking resources, etc. The cloud computing services 1910 can be centrally located (e.g., provided by a data center of a business or organization) or distributed (e.g., provided by various computing resources located at different locations, such as different data centers and/or located in different cities or countries).

The cloud computing services 1910 are utilized by various types of computing devices (e.g., client computing devices), such as computing devices 1920, 1922, and 1924. For example, the computing devices (e.g., 1920, 1922, and 1924) can be computers (e.g., desktop or laptop computers), mobile devices (e.g., tablet computers or smart phones), or other types of computing devices. For example, the computing devices (e.g., 1920, 1922, and 1924) can utilize the cloud computing services 1910 to perform computing operations (e.g., data processing, data storage, and the like).

In practice, cloud-based, on-premises-based, or hybrid scenarios can be supported.

Example 30—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 31—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
receiving an indication of a product component of a product represented in a database as a product component record, wherein the product comprises a plurality of product components, the product components comprising the product component, and wherein a product component corresponds to an input used in producing the product or an operational component of a produced product;

performing a search against a plurality of emission dataset records for an emission dataset record corresponding to the product component, wherein the search is based on one or more attributes of the product component;

returning search results comprising one or more found emission dataset records out of the plurality of emission dataset records, wherein a given found emission dataset record of the one or more found emission dataset records has a value for an attribute that matches a value of the one or more attributes of the product component;

presenting the one or more found emission dataset records in a user interface for confirmation;

receiving a selection of a confirmed emission dataset record out of the one or more found emission dataset records;

creating a mapping between the product component record and the confirmed emission dataset record; and using the mapping to perform a downstream operation, the downstream operation comprising retrieving the emission dataset record associated with the product component record and at least one of generating a sustainability metric for the product or generating a new mapping.

2. The method of claim 1 wherein:
the search weights at least one attribute higher than another during the search.

3. The method of claim 2 wherein:
the search weights a classification code attribute and a description attribute more highly than other attributes.

4. The method of claim 1 wherein:
the product component record comprises a plurality of product component attributes;
the emission dataset records comprise a plurality of emission dataset attributes;
configurable attribute mappings relate at least one of the product component attributes to at least one of the emission dataset attributes;
and the search incorporates the configurable attribute mappings.

5. The method of claim 4 wherein:
the configurable attribute mappings comprise one or more fallback attribute mappings; and
the method further comprises:
applying at least one of the fallback attribute mappings after failure of a higher-level mapping.

6. The method of claim 5 wherein:
the configurable attribute mappings comprise a mapping of product and provider country and a fallback mapping of product group and provider country.

7. The method of claim 5 wherein:
the configurable attribute mappings comprise a fallback mapping of commodity code or a portion of commodity code.

8. The method of claim 1 wherein:
the search maps a product component attribute name of the database to an attribute name of the emission dataset records according to a configurable attribute mapping.

9. The method of claim 8 wherein:
the configurable attribute mapping maps a provider country attribute of the product component record to a provider country attribute of the emission dataset records.

10. The method of claim 1 further comprising:
configuring a hard mapping rule; and
applying the hard mapping rule during footprint calculations.

11. The method of claim 1 further comprising:
performing assisted search via one or more filters.

12. The method of claim 1 wherein:
the search is based on the following attributes:
geographical location;
one or more product component classification codes; and
a textual description of the product component.

13. The method of claim 1 further comprising:
segmenting a classification code into a sub-segment of an entire code; and
applying the sub-segment during the search.

14. The method of claim 1 further comprising:
for a logical record, determining when to map to a rest-of-the-world dataset based on absence of a specific country in any parallel dataset within the plurality of emission dataset records.

15. The method of claim 1 further comprising:
monitoring selection of a confirmed emission dataset record selected by a user interface;
incorporating features of the confirmed emission dataset record into a training record; and
training a machine learning model with training data comprising the training record.

16. The method of claim 15 wherein:
the training data comprises confirmed emission dataset records from a plurality of tenants.

17. The method of claim 15 wherein:
the training weights in favor of the following features:
geographical location;
one or more product component classification codes; and
a textual description of the product component.

18. The method of claim 15 further comprising:
recasting previous rules as synthesized search results; and
incorporating the synthesized search results into the training data.

19. A computer system comprising:
at least one hardware processor;
at least one memory coupled to the at least one hardware processor; and
one or more computer-readable storage media comprising computer-executable instructions that, when executed, cause the computing system to perform operations comprising:
receiving an indication of a product component of a product represented in a database as a product component record, wherein the product comprises a plurality of product components, the plurality of product components comprising the product component;
performing a search against a plurality of emission dataset records for an emission dataset record corresponding to the product component;
returning search results comprising a plurality of found emission dataset records out of the plurality of emission dataset records;
presenting the plurality of found emission dataset records in a user interface for confirmation;
receiving a selection of at least one confirmed emission dataset record out of the plurality of found emission dataset records to provide a confirmed emission dataset record;

based on the selection, creating a mapping between the product component record and the confirmed emission dataset record;

using the mapping to perform a downstream operation, the downstream operation comprising retrieving the emission dataset record associated with the product component record and at least one of generating a sustainability metric for the product or generating a new mapping.

20. One or more tangible computer-readable storage media comprising:

computer-executable instruction that, when executed by a computing system comprising at least one hardware processor and at least one memory coupled to the at least one hardware processor, cause the computing system to receive an indication of a product component of a product represented in a database as a product component record, wherein the product comprises a plurality of product components, the product components comprising the product component;

computer-executable instruction that, when executed by the computing system, cause the computing system to perform a search against a plurality of emission dataset records for an emission dataset record corresponding to the product component;

computer-executable instruction that, when executed by the computing system, cause the computing system to return search results comprising one or more found emission dataset records out of the plurality of emission dataset records;

computer-executable instruction that, when executed by the computing system, cause the computing system to present the one or more emission dataset records in a user interface for confirmation;

computer-executable instruction that, when executed by the computing system, cause the computing system to receive a selection of at least one confirmed emission dataset record out of the plurality of found emission dataset records;

computer-executable instruction that, when executed by the computing system, cause the computing system to, based on the receiving a selection, create a mapping between the product component record and the confirmed emission dataset record; and computer-executable instruction that, when executed by the computing system, cause the computing system to train a machine learning model with training data comprising the product component and the corresponding confirmed emission dataset record based on the mapping, wherein the training improves accuracy of sustainability metrics for products.

* * * * *